US008626354B2

(12) United States Patent
Walter et al.

(10) Patent No.: US 8,626,354 B2
(45) Date of Patent: Jan. 7, 2014

(54) APPROACH FOR NORMALIZING AUTOMATED DEMAND RESPONSE EVENTS IN ENERGY MANAGEMENT CONTROL SYSTEMS

(75) Inventors: Gerald Walter, Canton, OH (US); Sadiq Basha, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 394 days.

(21) Appl. No.: 13/016,181

(22) Filed: Jan. 28, 2011

(65) Prior Publication Data

US 2012/0197456 A1 Aug. 2, 2012

(51) Int. Cl.
*G06F 19/00* (2011.01)

(52) U.S. Cl.
USPC .......................................... 700/295; 700/297

(58) Field of Classification Search
USPC ................................................. 700/295, 297
See application file for complete search history.

(56) References Cited

U.S. PATENT DOCUMENTS

| | | | |
|---|---|---|---|
| 4,110,827 | A | 8/1978 | Shavit |
| 4,130,874 | A | 12/1978 | Pai |
| 4,153,936 | A | 5/1979 | Scmitz et al. |
| 4,419,667 | A | 12/1983 | Gurr et al. |
| 4,850,010 | A | 7/1989 | Stanbury et al. |
| 4,937,760 | A | 6/1990 | Beitel et al. |
| 5,341,142 | A | 8/1994 | Reis et al. |
| 5,500,561 | A | 3/1996 | Wilhelm |
| 5,566,084 | A | 10/1996 | Cmar |
| 5,572,438 | A | 11/1996 | Ehlers et al. |
| 5,598,349 | A | 1/1997 | Elliason et al. |
| 5,719,854 | A | 2/1998 | Choudhury et al. |
| 5,822,553 | A | 10/1998 | Gifford et al. |
| 5,892,758 | A | 4/1999 | Argyroudis |
| 6,026,375 | A | 2/2000 | Hall et al. |
| 6,195,367 | B1 | 2/2001 | Jakobik et al. |

(Continued)

FOREIGN PATENT DOCUMENTS

| | | |
|---|---|---|
| WO | WO 2005033964 | 4/2005 |
| WO | WO 2008027455 | 3/2008 |

(Continued)

OTHER PUBLICATIONS

Holmberg, "Facility Interface to the Smart Grid," National Institute of Standards and Technology, 7 pages, printed 2012.

(Continued)

*Primary Examiner* — Michael D Masinick
(74) *Attorney, Agent, or Firm* — Seager Tufte & Wickhem LLC.

(57) ABSTRACT

An approach for normalizing automated demand response events in energy management and control systems. The normalizing may be of events having disparate communication protocols and data formats. There may be a processing engine for each unique protocol or data format. When event data are received, they may be normalized into a standard format which can be utilized by an energy management and control system to initiate a pre-programmed demand response strategy. In other words, using an auto demand response service with its normalized event information, standard response strategies may be developed. The auto demand response service and standard strategies may then be deployed across an entire multi-site enterprise regardless of the auto demand response service provider servicing a particular site. There appears no need to modify the demand response strategy because the auto demand response service may handle a transformation of the auto demand response system's event data.

6 Claims, 25 Drawing Sheets

(56) References Cited

U.S. PATENT DOCUMENTS

| | | | |
|---|---|---|---|
| 6,209,018 | B1 | 3/2001 | Ben-shacher et al. |
| 6,252,950 | B1 | 6/2001 | Duty et al. |
| 6,259,723 | B1 | 7/2001 | Miyashita |
| 6,278,717 | B1 | 8/2001 | Arsenault et al. |
| 6,289,384 | B1 | 9/2001 | Whipple et al. |
| 6,366,926 | B1 | 4/2002 | Pohlmann et al. |
| 6,446,136 | B1 | 9/2002 | Pohlmann et al. |
| 6,519,509 | B1 | 2/2003 | Nierlich et al. |
| 6,529,723 | B1 | 3/2003 | Bentley |
| 6,566,926 | B1 | 5/2003 | Patterson |
| 6,574,581 | B1 | 6/2003 | Bohrer et al. |
| 6,832,249 | B2 | 12/2004 | Ciscon et al. |
| 6,865,685 | B2 | 3/2005 | Hammond et al. |
| 6,985,087 | B2 | 1/2006 | Soliman |
| 7,010,700 | B1 | 3/2006 | Foss et al. |
| 7,039,532 | B2 | 5/2006 | Hunter |
| 7,069,309 | B1 | 6/2006 | Dodrill et al. |
| 7,260,616 | B1 | 8/2007 | Cook |
| 7,333,880 | B2 | 2/2008 | Brewster et al. |
| 7,337,237 | B2 | 2/2008 | Salahshoor et al. |
| 7,346,467 | B2 | 3/2008 | Bohrer et al. |
| 7,392,115 | B2 | 6/2008 | Schindler |
| 7,401,086 | B2 | 7/2008 | Chorafakis et al. |
| 7,528,503 | B2 | 5/2009 | Rognli et al. |
| 7,565,227 | B2 | 7/2009 | Richard et al. |
| 7,650,289 | B2 | 1/2010 | Cooper et al. |
| 7,676,657 | B2 | 3/2010 | Lindholm et al. |
| 7,702,424 | B2 | 4/2010 | Cannon et al. |
| 7,742,953 | B2 | 6/2010 | King et al. |
| 7,775,191 | B2 | 8/2010 | Hou |
| 7,797,009 | B2 | 9/2010 | Kiiskila et al. |
| 7,806,845 | B2 | 10/2010 | Arm et al. |
| 7,845,576 | B2 | 12/2010 | Siddaramanna et al. |
| 7,865,252 | B2 | 1/2011 | Clayton |
| 7,873,441 | B2 | 1/2011 | Synesiou et al. |
| 7,885,718 | B2 | 2/2011 | Yano et al. |
| 7,886,166 | B2 | 2/2011 | Shnekendorf et al. |
| 7,925,384 | B2 | 4/2011 | Huizenga et al. |
| 7,941,528 | B2 | 5/2011 | Hicks, III et al. |
| 7,954,726 | B2 | 6/2011 | Siddaramanna et al. |
| 7,958,229 | B2 | 6/2011 | Conway |
| 8,023,410 | B2 | 9/2011 | O'Neill |
| 8,073,558 | B2 | 12/2011 | Koch et al. |
| 8,091,794 | B2 | 1/2012 | Siddaramanna et al. |
| 8,140,658 | B1 | 3/2012 | Gelvin et al. |
| 8,163,276 | B2 | 4/2012 | Hedrick et al. |
| 8,170,774 | B2 | 5/2012 | Forte et al. |
| 8,183,995 | B2 | 5/2012 | Wang et al. |
| 8,199,773 | B2 | 6/2012 | Aubin et al. |
| 8,232,745 | B2 | 7/2012 | Chemel et al. |
| 8,234,876 | B2 | 8/2012 | Parsonnet et al. |
| 8,260,468 | B2 | 9/2012 | Ippolito et al. |
| 8,260,650 | B2 | 9/2012 | Miller |
| 8,291,243 | B2 | 10/2012 | Castelli et al. |
| 8,352,094 | B2 | 1/2013 | Johnson et al. |
| 8,373,547 | B2 | 2/2013 | Benya et al. |
| 8,406,937 | B2 | 3/2013 | Verfuerth et al. |
| 8,417,391 | B1 | 4/2013 | Rombouts et al. |
| 2003/0016237 | A1 | 1/2003 | Hickey |
| 2003/0033230 | A1 | 2/2003 | Mccall |
| 2003/0233064 | A1 | 12/2003 | Arm et al. |
| 2004/0034484 | A1 | 2/2004 | Solomita, Jr. et al. |
| 2004/0137897 | A1 | 7/2004 | Teixeira |
| 2004/0203649 | A1 | 10/2004 | Cashiola |
| 2005/0027636 | A1 | 2/2005 | Gilbert et al. |
| 2005/0152694 | A1 | 7/2005 | Chown |
| 2005/0172304 | A1 | 8/2005 | Tavares et al. |
| 2005/0194456 | A1 | 9/2005 | Tessier et al. |
| 2005/0229220 | A1 | 10/2005 | Fisher et al. |
| 2005/0262026 | A1 | 11/2005 | Watkins |
| 2007/0005195 | A1 | 1/2007 | Pasquale et al. |
| 2007/0222295 | A1 | 9/2007 | Wareham et al. |
| 2008/0011864 | A1 | 1/2008 | Tessier et al. |
| 2008/0046715 | A1 | 2/2008 | Balazs et al. |
| 2008/0167931 | A1 | 7/2008 | Gerstemeier et al. |
| 2008/0177678 | A1 | 7/2008 | Di Martini et al. |
| 2008/0262848 | A1 | 10/2008 | Shienbrood et al. |
| 2009/0046625 | A1 | 2/2009 | Diener et al. |
| 2009/0049202 | A1* | 2/2009 | Pattison et al. .............. 709/249 |
| 2009/0092062 | A1 | 4/2009 | Koch et al. |
| 2009/0187499 | A1 | 7/2009 | Mulder et al. |
| 2009/0198384 | A1 | 8/2009 | Ahn |
| 2009/0204977 | A1 | 8/2009 | Tavares et al. |
| 2009/0271255 | A1 | 10/2009 | Utter et al. |
| 2009/0281674 | A1 | 11/2009 | Taft |
| 2009/0295594 | A1 | 12/2009 | Yoon |
| 2009/0297488 | A1 | 12/2009 | Fraser et al. |
| 2009/0313083 | A1 | 12/2009 | Dillon et al. |
| 2009/0319090 | A1 | 12/2009 | Dillon et al. |
| 2009/0326726 | A1 | 12/2009 | Ippolito et al. |
| 2010/0057480 | A1 | 3/2010 | Arfin et al. |
| 2010/0076615 | A1 | 3/2010 | Daniel et al. |
| 2010/0076835 | A1 | 3/2010 | Silverman |
| 2010/0088261 | A1 | 4/2010 | Montalvo |
| 2010/0106342 | A1 | 4/2010 | Ko et al. |
| 2010/0106543 | A1 | 4/2010 | Marti |
| 2010/0114340 | A1 | 5/2010 | Huizenga et al. |
| 2010/0138363 | A1* | 6/2010 | Batterberry et al. .......... 705/412 |
| 2010/0168924 | A1 | 7/2010 | Tessier et al. |
| 2010/0274377 | A1 | 10/2010 | Kaufman et al. |
| 2010/0283606 | A1* | 11/2010 | Tsypin et al. ................ 340/540 |
| 2010/0324962 | A1* | 12/2010 | Nesler et al. ..................... 705/8 |
| 2011/0016200 | A1 | 1/2011 | Koch |
| 2011/0040550 | A1 | 2/2011 | Graber et al. |
| 2011/0040666 | A1 | 2/2011 | Crabtree et al. |
| 2011/0046805 | A1 | 2/2011 | Bedros et al. |
| 2011/0093493 | A1 | 4/2011 | Nair et al. |
| 2011/0113068 | A1 | 5/2011 | Ouyang |
| 2011/0125542 | A1 | 5/2011 | Koch |
| 2011/0172836 | A1 | 7/2011 | Boss et al. |
| 2011/0172838 | A1 | 7/2011 | Pai et al. |
| 2011/0196539 | A1 | 8/2011 | Nair et al. |
| 2011/0196546 | A1 | 8/2011 | Muller et al. |
| 2011/0199209 | A1 | 8/2011 | Siddaramanna et al. |
| 2011/0212700 | A1 | 9/2011 | Petite |
| 2011/0231320 | A1 | 9/2011 | Irving |
| 2011/0258049 | A1 | 10/2011 | Ramer et al. |
| 2011/0301774 | A1 | 12/2011 | Koch |
| 2012/0066397 | A1 | 3/2012 | Koch et al. |
| 2012/0066686 | A1 | 3/2012 | Koch |
| 2012/0093141 | A1 | 4/2012 | Imes et al. |
| 2012/0109399 | A1 | 5/2012 | Tran |
| 2012/0136915 | A1 | 5/2012 | Koch |
| 2012/0173030 | A1 | 7/2012 | Taft |
| 2012/0197457 | A1 | 8/2012 | Walter et al. |
| 2012/0197458 | A1 | 8/2012 | Walter et al. |
| 2012/0245968 | A1 | 9/2012 | Beaulieu et al. |
| 2012/0271473 | A1 | 10/2012 | Koch |
| 2012/0277920 | A1 | 11/2012 | Koch |
| 2013/0035992 | A1 | 2/2013 | Silverman |
| 2013/0079931 | A1 | 3/2013 | Wanchoo et al. |

FOREIGN PATENT DOCUMENTS

| | | |
|---|---|---|
| WO | WO 2008027457 | 3/2008 |
| WO | WO 2009/006133 | 1/2009 |
| WO | WO 2009/020606 | 2/2009 |
| WO | WO 2009/023230 | 2/2009 |
| WO | WO 2009/027617 | 3/2009 |
| WO | WO 2009/085610 | 7/2009 |
| WO | WO 2011/065007 | 6/2011 |
| WO | WO 2013/025565 | 2/2013 |
| WO | WO 2013/055551 | 4/2013 |

OTHER PUBLICATIONS

Abdullah et al., "Demand-Side Energy Management Performed Using Direct Feedback via Mobile Systems: Enables Utilities to Deploy Consumer Based Demand Response Programs," 2010 IEEE International Energy Conference and Exhibition, pp. 172-177, 2010.

European Search Report for Related Application No. EP 12169650.4, Dated Nov. 22, 2012.

U.S. Appl. No. 13/621,195, filed Sep. 15, 2012.

(56) References Cited

OTHER PUBLICATIONS

U.S. Appl. No. 12/895,640, filed Sep. 30, 2010.
U.S. Appl. No. 13/016,265, filed Jan. 28, 2011.
U.S. Appl. No. 13/016,306, filed Jan. 28, 2011.
U.S. Appl. No. 13/272,086, filed Oct. 12, 2011.
U.S. Appl. No. 13/298,706, filed Nov. 17, 2011.
U.S. Appl. No. 13/299,716, filed Nov. 18, 2011.
Coughlin et al., "Estimating Demand Response Load Impacts: Evaluation of Baseline Load Models for Non-Residential Buildings in California," Lawrence Berkeley National Laboratory, Report No. LBNL-63728, 33 pages, Jan. 2008.
Cruz, "Tutorial on GPU Computing with an Introduction to CUDA," 37 pages, prior to Nov. 17, 2011.
Honeywell, "Automated Demand Response—Southern California Program," 2 pages, printed Aug. 1, 2011.
Honeywell, "The Perfect Response to Peak Events," 4 pages, Nov. 2010.
http://en.wikipedia.org/wiki/Demand_response, "Demand Response," 10 pages, printed Feb. 3, 2012.
https://buildingsolutions.honeywell.com/Cultures/en-US/Markets/Utilities/DemandResponse/, 1page, printed Feb. 3, 2012.
Kiliccote et al., "Findings from Seven Years of Field Performance Data for Automated Demand Response in Commercial Buildings," Lawrence Berkeley National Laboratory, Report No. LBNL-3643E, May 2010.
Kiliccote et al., "Open Automated Demand Response for Small Commercial Buildings," Lawrence, Berkeley National Laboratory, Report No. LBNL-2195E, 104 pages, Jul. 2009.
Kiliccote et al., "Open Automated Demand Response Communications in Demand Response for Wholesale Ancillary Services," Lawrence Berkeley National Laboratory, Report No. LBNL-2945E, 13 pages, Nov. 2009.
Koch et al., "Architecture Concepts and Technical Issues for an Open, Interoperable Automated Demand Response Infrastructure," Berkeley National Laboratory, Report No. LBNL-63664, 7 pages, Oct. 2007.
Koch et al., "Direct Versus Facility Centric Load Control for Automated Demand Response," Lawrence Berkele National Laborator , Report No. LBNL-2905E, 11 pages, Nov. 2009.
Koch et al., "Scenarios for Consuming Standardized Automated Demand Response Signals," Lawrence Berkele National Laboratory, Report No. LBNL-1362E, 10 pages, Nov. 2008.
Koch, "The Demand Response Automation Server (DRAS)," Building Performance, http://www.akuacom.com/assets/pdf/ASHRAE_2008_Ed_Koch.pdf, 18 pages, prior to Nov. 17, 2011.
Piette et al., "Automated Critical Peak Pricing Field Tests: 2006 Pilot Program Description and Results," Berkele National Laboratory, Report No. LBNL-62218, 67 pages, Aug. 2007.
Piette et al., "Automated Critical Peak Pricing Field Tests: Program Description and Results," Lawrence Berkeley National Laboratory, Report No. LBNL-59351, Apr. 2006.
Piette et al., "Design and Implementation of an Open, Interoperable Automated Demand Response Infrastructure," Berkeley National Laboratory, Report No. LBNL-63665, 6 pages, Oct. 2007.
Piette et al., "Findings From the 2004 Fully Automated Demand Response Tests in Large Facilities," Lawrence Berkeley National Laboratory, Report No. LBNL-58178, 197 pages, Sep. 2005.
Piette et al., "Linking Continuous Energy Management and Open Automated Demand Response," Lawrence Berkele National Laboratory, Report No. LBNL-1361E, 9 pages, Nov. 2008.
Piette et al., "Open Automated Demand Response Communications Specification," Version 1.0, CEC-500-2009-063, 214 pages, Apr. 2009.
Piette et al., "Participation through Automation: Fully Automated Critical Peak Pricing in Commercial Buildings," Berkeley National Laboratory, Report No. LBNL-60614, 14 pages, Aug. 13-18, 2006.
Watson et al., "Machine to Machine (M2M) Technology in Demand Responsive Commercial Buildings," Berkeley National Laboratory, Report No. LBNL-55087, 18 pages, Aug. 2004.
Yin et al., "Auto-DR and Pre-Cooling of Buildings at Tri-City Corporate Center," Lawrence Berkeley National Laboratory, Report No. LBNL-3348, 140 pages, Nov. 2008.
"Demand Response Measurement and Verification Literature Review," 29 pages, prior to Nov. 29, 2012.
"Smart Demand Response: A Discussion Paper," Energy Networks Association, energyuk, 44 pages, prior to Nov. 29, 2012.
International Search Report for PCT ApplicationSerial No. pct/us2012/058537, International Filing Date Oct. 3, 2012.
U.S. Appl. No. 13/689,551, filed Nov. 29, 2012.
Hunt, "Automated Demand Response System and Advanced End-Use Services Platform," Optimal Technologies, 31, pages, Sep. 24, 2004.
Olson, "New Approaches in Automating and Optimizing Demand Response to Solve Peak Load Management Problems," Building IQ brochure, 8 pages, 2011.
Schisler et al., "The Role of Demand Response in Ancillary Services Markets," IEEE, 3 pages, 2008.
Violette et al., "DRR Valuation and Market Analysis vol. II: Assessing the DRR Benefits and Costs," Summit Blue Consulting, 112 pages, Jan. 6, 2006.
Zaidi et al., "Load Recognition for Automated Demand Response in Microgrids," IEEE, pp. 2436-2439, 2010.

* cited by examiner

FIGURE 7a

198

```
<p:drEvent programName="PublicPowerSaver" eventID="20100511"
clientID="client1">
 <p:eventData>
      <p:notificationTime>2010-05-11T11:45</p:notificationTime>
        <p:startTime>2010-05-11T12:00</p:startTime>
        <p:endTime>2010-05-11T17:00</p:endTime>
        <p:eventShedLevel>MODERATE</p:eventShedLevel >
      </p:eventData>
      </p:drEvent>
```

FIGURE 7b

199

```
<p:drEvent programName="PublicPowerSaver" eventID="20100511" clientID="client1">
 <p:eventData>
          <p:eventSchedule>
           <p:scheduleSlot>
            <p:slotTime>2010-05-11T13:00</p:slotTime>
            <p:slotShed>3</p:slotShed>
           </p:scheduleSlot>
           <p:scheduleSlot>
            <p:slotTime>2010-05-11T13:30</p:slotTime>
            <p:slotShed>5</p:slotShed>
           </p:scheduleSlot>
           <p:scheduleSlot>
            <p:slotTime>2010-05-11T14:00</p:slotTime>
            <p:slotShed>7</p:slotShed>
           </p:scheduleSlot>
           <p:scheduleSlot>
            <p:slotTime>2010-05-11T17:00</p:slotTime>
            <p:slotShed>3</p:slotShed>
           </p:scheduleSlot>
           <p:scheduleSlot>
            <p:slotTime>2010-05-11T17:30</p:slotTime>
            <p:slotShed>0</p:slotShed>
           </p:scheduleSlot>
          </p:eventSchedule>
         </p:eventData>
        </p:drEvent>
```

92

APPROACH FOR NORMALIZING AUTOMATED DEMAND RESPONSE EVENTS IN ENERGY MANAGEMENT CONTROL SYSTEMS

BACKGROUND

The present disclosure pertains to energy management and control. Particularly, the disclosure pertains to demand response events in energy management and control.

SUMMARY

The disclosure reveals normalizing automated demand response events in energy management and control systems. The normalizing may be of events having disparate communication protocols and data formats. There may be a processing engine for each unique protocol or data format. When event data are received, they may be normalized into a standard format which can be utilized by an energy management and control system to initiate a pre-programmed demand response strategy. In other words, using an automated demand response service with its normalized event information, standard response strategies may be developed. The automated demand response service and standard strategies may then be deployed across an entire multi-site enterprise regardless of the automated demand response service provider servicing a particular site. There appears no need to modify the demand response strategy because the automated demand response service may handle a transformation of the automated demand response system's event data. Automated demand response may be a platform for achieving reliable, consistent performance of demand response programs by removing the need for human intervention.

BRIEF DESCRIPTION OF THE DRAWINGS

FIG. 7*a* is an example program of a sample automated demand response event;

FIG. 7*b* is another example program of a sample automated demand response event;

DESCRIPTION

Figure 1:
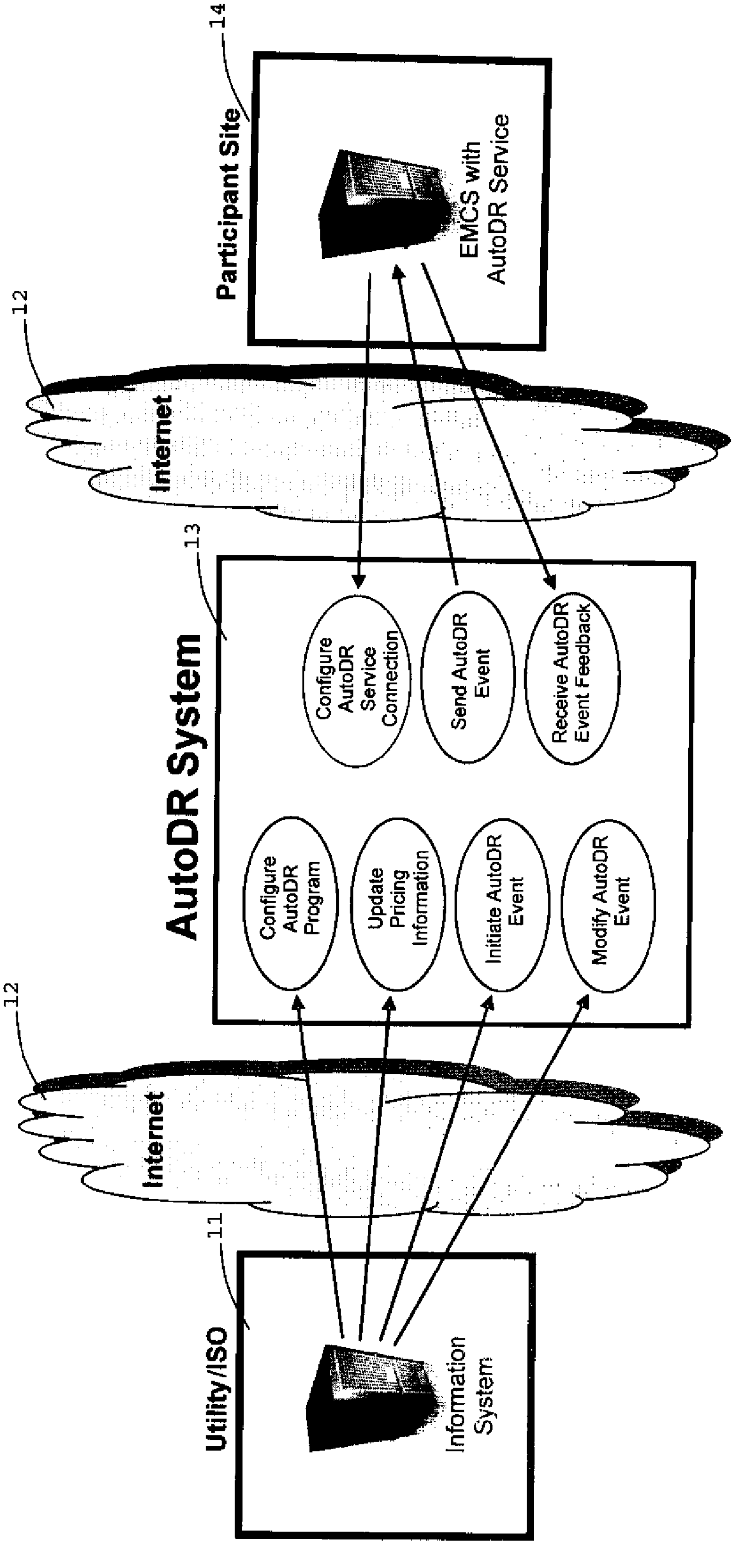
FIG. 1 is a diagram of automated demand response architecture.

Patent application Ser. No. 13/016,265 entitled "An Approach for Managing Distribution of Automated Demand Response Events in a Multi-Site Enterprise", and patent application Ser. No. 13/016,306 entitled "Management and Monitoring of Automated Demand Response in a Multi-Site Enterprise", may be relevant to the present application.

A first approach may be for normalizing automated demand response events in energy management and control systems. Automated demand response (auto DR) may be a platform for achieving reliable, consistent performance of demand response programs by removing a need for human intervention. Several issues may be encountered when implementing auto DR. First, there may be a wide array of electricity providers, energy operators, independent system operators (ISOs), and aggregators (i.e., energy entities). Each of these entities may communicate with the energy management and control system (EMCS) using a different communication protocol and/or data format. Second, in a multi-site enterprise, sites may be distributed across a large geographic area. As a result, the enterprise may be serviced by, for example, multiple electricity providers. Implementing auto DR across the enterprise may necessitate supporting the auto DR system of each provider.

Also, supporting the data formats of multiple auto DR systems can increase the complexity and cost of deploying a demand response strategy across the enterprise. Any variation in data content may require customization of the interface to the demand response strategy. As a result, the enterprise should support a custom site configuration for each unique data format.

Portions of the approaches and/or apparatus noted herein may be referred to as systems, subsystems, entities, mechanisms, modules, and/or the like.

The first approach may be for normalizing the auto DR events of disparate communication protocols and data formats. Support for auto DR events may be provided by an auto DR service. The service may include a processing engine for each unique protocol or data format. Each processing engine may provide a communication mechanism for receiving and acknowledging auto DR events and a mechanism for transmitting EMCS feedback regarding load shed results.

When event data are received, they may be normalized into a standard format which can be utilized by the EMCS to initiate a preprogrammed demand response strategy. Normalizing the data may allow the enterprise to define a standard demand response strategy which can be deployed to any site, regardless of the auto DR system servicing the site. Using the auto DR service with its normalized event information, standard demand response strategies may be developed. These standard strategies may then be deployed across an entire multi-site enterprise regardless of the auto DR system provider servicing a particular site. There is no necessary need to modify the demand response strategy because the auto DR service may handle the normalization of the auto DR system's event data.

Normalization may resolve the problems faced when implementing support for automated demand response. The complexities of interfacing with the numerous auto DR systems encountered by a multi-site enterprise may be eliminated; any protocol or data format may be integrated into the auto DR service through a processing engine. The development and maintenance costs associated with deploying and supporting demand response strategies may be reduced; a standard set of demand response strategies, based on normalized demand response event data, may be deployed across an entire multi-site enterprise.

Demand response may be a mechanism of compelling customers to reduce consumption of electricity in response to changes in supply conditions; these changes may be critical periods of peak demand or fluctuations in market price. Implementation of demand response strategies may usually involve the energy management and control system (EMCS) shedding electrical load by dimming or turning off lights, or by adjusting temperature setpoints. The present approaches may be applicable to other forms of energy. Electricity is an illustrative example used herein. Other items may be may be used in the present approaches.

A very basic application may be a manual demand response. Site personnel may receive a signal (phone call, text message, or email) and manually reduce demand. Auto DR systems may handle the generation, management, and monitoring of demand response signals between, for instance, the electricity service providers and the EMCS. The auto DR may rely on pre-programmed demand response strategies in the EMCS. Execution of these strategies may be triggered by receipt of an external signal from the auto DR system.

The auto DR system may be a computing platform designed to facilitate communications between, for example, electricity providers (i.e., electric utilities, independent system operators) and electricity consumers. Providers may define demand response programs based on expected periods of peak demand and/or periods of fluctuating price. Consumers may participate in these demand response programs by agreeing to reduce electrical demand. Based on the providers' defined demand response program, the auto DR system may transmit auto DR events to the participating consumers' EMCS. Integrated into the EMCS, the auto DR service may be responsible for virtually all interaction with the auto DR system.

An auto DR event may contain the information required to alter electrical load usage within the EMCS. The content of the event may be different for each auto DR system. The information could include the start time and end time of the event. Additionally, this event could include an indication of the expected level of load shed, possibly represented as a numeric value (i.e., 0 to 10) or as an enumeration (i.e., low, medium, and high). Or, the event could contain a schedule which defines a series of time slots; each time period having an associated shed level (either numeric or enumeration).

The auto DR service may consist of the processing engines, a protocol selector, demand response client (auto DR Client), current event information, event feedback, and a list of received events.

The protocol selector may allow the user to choose the processing engine applicable to the auto DR system. The engine may interact with the auto DR system to receive and acknowledge auto DR events and provide demand response feedback. The engine may implement the logic necessary to interpret the system's event information and translate that information into the normalized current event information. Additionally, the engine may translate EMCS feedback into a format that is compatible with the auto DR system.

The demand response client (auto DR client) may contain the properties required to configure the service's connection with the auto DR system. The interface between the client and the auto DR system may be either a push or a pull model. In the push model, the auto DR system may send events to the client as they occur. Conversely, the pull model may require the client to poll the auto DR system for event information at some defined frequency.

Current event information may be the normalized event data. As the processing engine decodes and interprets the received event, values in current event information may be set. These values may contain part of the interface to the EMCS control strategies.

Event feedback may provide the other piece of the EMCS control strategies interface. This may allow a facility to supply performance metrics to the auto DR system. Data regarding the control system's demand response effort may be calculated and reported to the feedback component. The processing engine may transform the feedback data into the format compatible with the auto DR system and transmit a communications packet in a required protocol.

In one version, the first approach may be built as in the following. 1) Add the auto DR service component to the EMCS. 2) Configure the auto DR client. This may consist of setting the parameters needed to communicate with the auto DR system. These parameters may contain the communication type (PUSH or PULL), the location of the auto DR system, the authentication credentials, and the auto DR system protocol. The selected protocol may determine which processing engine will interact with the auto DR system. 3) Link the current event information parameters to the EMCS demand response strategy. 4) Link the EMCS demand response performance metrics data to the event feedback parameters.

Based on the configuration of the auto DR client, the selected processing engine may either request auto DR events at a programmed interval (i.e., ~pull) or wait for events to be transmitted by the auto DR system (i.e., ~push).

When the engine obtains an event, the data may be decoded into the normalized elements of the client's current event information component. The normalized event details may then be propagated to the EMCS according to the previously defined linkage.

As the EMCS responds to the demand response event, electrical loads may be shed; this may involve adjustments to temperature setpoints, dimming or turning off lights, and/or other modifications to building systems which reduce the demand of electrical loads. During the auto DR event, information about electrical load usage levels, the amount of electrical load being shed or other demand response metrics may be propagated to the client's event feedback component using the previously defined linkage. The selected processing engine may encode this feedback information and transmit a message to the auto DR system.

The second approach may be for managing the distribution of automated demand response events in a multi-site enterprise. Here, automated demand response (auto DR) may be a platform for achieving more reliable and consistent performance of demand response programs by removing the need for human intervention.

Several issues may be encountered when implementing support for auto DR. First, there may be the wide array of electricity providers, independent system operators, and aggregators (i.e., energy entities). Each of these entities may communicate with the EMCS using a different communication protocol and/or data format. Second, in a multi-site enterprise, sites may be distributed across a large geographic area. As a result, the enterprise may be serviced by multiple electricity providers. Implementing auto DR across the enterprise may necessitate supporting the auto DR system of each provider. Lastly, supporting the data formats of multiple auto DR systems may increase the complexity and cost of deploying a demand response strategy across the enterprise. Any variation in data content may require customization of the interface to the demand response strategy. As a result, the enterprise should support a custom site configuration for each unique data format.

The first approach, for normalizing automated demand response events in energy management and control systems, may resolve these issues with a site-level solution. While addressing the normalization issue, the first approach may ignore a critical problem faced by the enterprise.

The auto DR system may need a network connection to each EMCS site controller. This means that there may be multiple, external points of access inside the enterprise's network firewall. Larger sites may require multiple EMCS controllers which increases the number of auto DR access points and thereby compounds the vulnerability of the network. Enterprise information technology (IT) personnel may minimize this vulnerability through firewall configuration and monitoring. However, this may add to the cost and overhead of managing the enterprise network, especially in enterprises with hundreds or thousands of sites. In an enterprise with sites located across a large geographic area, the IT department should manage and monitor the external network access of numerous auto DR systems. The second approach may be for managing the distribution of automated demand response events (auto DR events) in a multi-site enterprise.

Event distribution may be controlled by an auto DR gateway. At the enterprise level, the auto DR gateway may be implemented as a supervisor service. The gateway may be configured to connect with an auto DR system. This may allow the supervisor service to receive events from the auto DR system and route them to virtually all registered EMCS site controllers. Also, the service may forward confirmation and feedback messages from the site controller to the auto DR system.

At the site level, event distribution may be managed in two ways. First, the auto DR service (shown relative to in the first approach) may be configured to utilize a gateway connection rather than a direct connection to an auto DR system. The service's auto DR client settings may be modified to select the site's EMCS supervisor as the host station. The site service may register with the selected supervisor gateway for auto DR events. When an event is received by the site controller's auto DR service, a confirmation message may be sent to the gateway for forwarding to the auto DR system. During the demand response event, information about electrical load usage levels, amount of load being shed, and other demand response metrics may be sent to the auto DR system through the gateway.

Second, the auto DR gateway functionality may be added to the auto DR service shown relative to the first approach. When this functionality is enabled, the service may route events to other EMCS site controllers within a facility. Likewise, the service may route auto DR related messages from the other site controllers back to the auto DR system.

Auto DR systems may handle the generation, management, and monitoring of demand response signals between electricity service providers and the energy management and control system (EMCS). The auto DR may rely on pre-programmed demand response strategies in the EMCS. Execution of these strategies may be triggered by receipt of an external signal from the auto DR system.

Event distribution may be controlled by an auto DR gateway. This gateway concept may be implemented as two components, the enterprise level and the site level. At the enterprise level, the auto DR gateway may be an extension to the EMCS supervisor. This gateway may perform two primary tasks: 1) Route auto DR events from an auto DR system to EMCS site controllers; and 2) Route auto DR-related messages from EMCS site controllers to an auto DR system.

At the site level, auto DR gateway functionality may be an extension to the auto DR service shown relative to the first approach. This gateway may perform two primary tasks: 1) Route auto DR events from an auto DR system or enterprise-level auto DR gateway to other EMCS site controllers within a single site; and 2) Route auto DR-related messages from other EMCS site controllers to an auto DR system or enterprise-level auto DR gateway. If a message is routed to an enterprise-level gateway, it may be the task of that gateway to forward the message to an auto DR system.

The EMCS supervisor may be a framework for managing a multi-site enterprise of EMCS site controllers. (One may note enterprise model extensions to Niagara AX.) U.S. patent application Ser. No. 12/260,046, filed Oct. 28, 2008, and entitled "A Building Management Configuration System", may be relevant. U.S. patent application Ser. No. 12/260,046, filed Oct. 28, 2008, is hereby incorporated by reference.

The following patent documents may also be relevant. One may note U.S. patent application Ser. No. 12/703,476, filed Feb. 10, 2010, and entitled "A Multi-Site Controller Batch Update System". U.S. patent application Ser. No. 12/703,476, filed Feb. 10, 2010, is hereby incorporated by reference. One may note U.S. patent application Ser. No. 12/896,842, filed Oct. 1, 2010, and entitled "Building Management System Site Categories". U.S. patent application Ser. No. 12/896,842, filed Oct. 1, 2010, is hereby incorporated by reference. One may note U.S. patent application Ser. No. 12/895,640, filed Sep. 30, 2010, and entitled "A User Interface List Control System". U.S. patent application Ser. No. 12/895,640, filed Sep. 30, 2010, is hereby incorporated by reference.

The auto DR system may be a computing platform designed to facilitate communications between electricity providers (i.e., electric utilities, independent system operators) and electricity consumers. Providers may define demand response programs based on expected periods of peak demand and/or periods of fluctuating price. Consumers may participate in these demand response programs by agreeing to reduce electrical demand. Based on the providers' defined demand response program, the auto DR system may transmit auto DR events to the participating consumers' EMCS site controller. Integrated into the site controller, the auto DR service of the first approach may be responsible for virtually all interaction with the auto DR system. The second approach may shift that interaction to the EMCS supervisor.

An auto DR event may contain the information required to alter electrical load usage within the EMCS. The content of the event may be different for each auto DR system. The information may include the start time and end time of the event. Additionally, this event may include an indication of the expected level of load shed, possibly represented as a numeric value (i.e., 0 to 10) or as an enumeration (i.e., low, medium, and high). Or, the event may contain a schedule which defines a series of time slots; each time period having an associated shed level (either numeric or enumeration).

The auto DR supervisor service may be an extension to the EMCS supervisor's functionality. This service may support one or more auto DR gateways. A gateway may be created for each auto DR system that is an electricity service provider to the enterprises' sites.

The auto DR gateway may contain the properties required to configure a connection with an auto DR system. The interface between the gateway and the auto DR system may be either a push or a pull model. In the push model, the auto DR system may send events to the gateway as they occur. Conversely, the pull model may require the gateway to poll the auto DR system for event information at some defined frequency. The ability to support the auto DR system's protocol as shown relative to the first approach may be implemented in the supervisor's auto DR gateway.

A gateway may support one or more demand response clients; each client representing an enrollment in a demand response program.

The demand response client (auto DR client) may contain the credentials needed to access the auto DR system.

The auto DR service of the first approach may be extended to add gateway functionality. When this functionality is enabled, the service may route events to other EMCS site controllers within a facility. Likewise, the service may route auto DR-related messages from the other site controllers back to the auto DR system.

At the enterprise level, an auto DR gateway may be added to the supervisor service. The gateway may be configured to connect with an auto DR system using the specified client credentials. This may allow the supervisor service to receive events from the auto DR system and route them to virtually all registered EMCS site controllers. Also, the service may forward confirmation and feedback messages from the site controllers to the auto DR system.

At the site level, the auto DR service may be configured to utilize a gateway connection rather than a direct connection to an auto DR system. The service's auto DR client settings may be modified to select the site's EMCS supervisor as the host station. An appropriate gateway and the gateway client should also be configured. Using these parameters, the site service may register with the selected supervisor gateway for auto DR events. When an event is received by the site controller's auto DR service, a confirmation message may be sent to the gateway for forwarding to the auto DR system. During the demand response event, information about electrical load usage levels, amount of load being shed, and other demand response metrics may be sent to the auto DR system through the gateway.

Optionally, a site controller's auto DR service may be configured to function as a gateway. If this functionality is enabled, the site controller's service may use a received event to initiate the execution of a demand response strategy; and the service's gateway may route the event to virtually all site controllers within the same site that have registered with the gateway.

When a site controller's auto DR service is configured to receive events from a local gateway connection, the client may be assigned a local EMCS site controller as its host station. The service may then register with the gateway of the selected local site controller.

In a first version of the second approach, it may be built as in the following. 1) Configure the EMCS supervisor. 2) Add the auto DR service component to the EMCS supervisor. 3) Add an auto DR gateway to the service's gateway container (auto DR gateway list). 4) Configure the gateway. This may consist of setting the parameters needed to communicate with the auto DR system. These parameters may incorporate the communication type (push or pull), the location of the auto DR system, and the auto DR system protocol. The selected protocol may determine which processing engine will interact with the auto DR system to receive and transmit auto DR messages (as shown relative to the first approach). 5) Add an auto DR client to the gateway and assign the authentication credentials. 6) Configure the EMCS site controller. 7) Add the auto DR service component to the site controller. 8) Configure the auto DR client. This may consist of setting the parameters needed to communicate with the supervisor service. These parameters may include the host station, the gateway, the client, and the auto DR system protocol. The selected protocol may determine which processing engine will decode and encode the auto DR messages (as shown relative to the first approach). The host station assignment may be based on the type of gateway being used. If the site controller will receive and transmit message using a supervisor gateway, the EMCS supervisor may be selected. 8) Select the appropriate local site controller if messages will be communicated through a local gateway. 9) Link the current event information parameters to the EMCS demand response strategy. 10) Link the EMCS demand response performance metrics data to the event feedback parameters.

If the site controller's auto DR service needs to support other site controllers within the facility, the "XCM as Gateway" functionality may be enabled.

Based on the configuration of the auto DR gateway, the selected processing engine may either request auto DR events at a programmed interval or wait for events to be transmitted by the auto DR system.

When the engine obtains an event, the supervisor service may route the message to virtually all site controllers which have registered with the gateway.

When the EMCS site controller's auto DR service receives the event message, the appropriate processing engine may decode the data into the normalized elements of the client's current event information component. The normalized event details may then be propagated to the EMCS according to the previously defined linkage.

As the EMCS site controller responds to the demand response event, electrical loads may be shed; this may involve adjustments to temperature setpoints, dimming or turning off lights, or other modifications to building systems which reduce the demand of electrical loads. During the auto DR event information about electrical load usage levels, an amount of electrical load being shed or other demand response metrics may be propagated to the client's event feedback component using the previously defined linkage. The selected processing engine may encode this feedback information and transmit a message to the assigned gateway.

A third approach may be for management and monitoring of automated demand response in a multi-site enterprise. The first approach, for normalizing automated demand response events in energy management and control systems, may provide a site-level solution for the problems a multi-site enterprise encounters when interfacing to auto DR systems. The second approach, for managing the distribution of automated demand response events in a multi-site enterprise, may resolve the enterprise networking issues which can occur when implementing support for automated demand response. Key auto DR issues not addressed by the first and second approaches may incorporate the following: 1) Awareness of upcoming demand response events; 2) Monitoring the actual response to a demand response event; 3) Analyzing EMCS performance and cost benefits of auto DR program participation; 4) The ability to opt-out of a demand response event; 5) Managing and controlling the demand response strategy; not only defining the load shed strategy, but also deploying that strategy to each site.

The complexity and cost of these issues may be directly related to the scale of the multi-site enterprise. Addressing these items at the site-level may be too burdensome and time consuming. Managing and monitoring at the site-level may necessitate connecting to each site's EMCS to check event status, view demand response performance metrics, opt-out of an event, or update demand response control strategies.

For management and monitoring of automated demand response to be efficient and economical, solutions should be available at the enterprise level.

The third approach may be a solution for the issues associated with managing and monitoring automated demand response events (auto DR events) in a multi-site enterprise. Enterprise-level and site-level enhancements may be implemented to resolve these issues.

At the enterprise level, the auto DR supervisor service shown relative the second approach may be enhanced to add management and monitoring functionality. The added capabilities may be as in the following: 1) Message exchange with the site-level auto DR service to enable management and monitoring activities; 2) Support for user interfaces that allow event monitoring and enable management actions such as opting-out of an event; and 3) Integration with a batch service to facilitate bulk updates of demand response strategy across the enterprise. One or more certain kinds of batch service approaches may be noted in U.S. patent application Ser. No. 12/703,476, filed Feb. 10, 2010, and entitled "A Multi-Site Controller Batch Update System". U.S. patent application Ser. No. 12/703,476, filed Feb. 10, 2010, is hereby incorporated by reference.

At the site level, new functionality may be an extension to the auto DR service as shown relative to the first approach. The added capabilities may be as in the following: 1) Message exchange with the enterprise-level auto DR supervisor service to facilitate management and monitoring activities; and 2) Event response mechanism and user interface that enable management decision to opt-out of an event.

These new capabilities may allow the two services to exchange messages related to auto DR activity. Messaging may facilitate a shift of demand response monitoring and management to the enterprise level. It is no longer necessary to perform these tasks on a site-by-site basis.

The EMCS supervisor may be a framework for managing a multi-site enterprise of EMCS site controllers. (One may note enterprise model extensions to Niagara AX.) U.S. patent application Ser. No. 12/260,046, filed Oct. 28, 2008, and entitled "A Building Management Configuration System", may be relevant. U.S. patent application Ser. No. 12/260,046, filed Oct. 28, 2008, is hereby incorporated by reference.

The auto DR system may a computing platform designed to facilitate communications between energy providers, for instance, electric utilities, independent system operators, aggregators and electricity consumers (i.e., energy entities). Providers may define demand response programs based on expected periods of peak demand and/or periods of fluctuating price. Consumers may participate in these demand response programs by agreeing to reduce electrical demand. Based on the providers' defined demand response program, the auto DR system may transmit auto DR events to the participating consumers' EMCS site controller.

An auto DR event may have the information required to alter electrical load usage within the EMCS. The content of the event may be different for each auto DR system. The information may incorporate the start time and end time of the event. Additionally, the event may incorporate an indication of the expected level of load shed, possibly represented as a numeric value (i.e., 0 to 10) or as an enumeration (i.e., low, medium, and high). Or, the event may incorporate a schedule which defines a series of time slots; each time period having an associated shed level (either numeric or enumeration).

The auto DR supervisor service of the second approach may be enhanced to add management and monitoring capability at the enterprise level. An auto DR Monitor component may allow the supervisor service to exchange messages with EMCS site controllers.

The auto DR service of the first approach may be enhanced, allowing the site-level EMCS controller to support management and monitoring at the enterprise supervisor. A property may be added to allow user selection of the EMCS supervisor which may monitor this controller's activity.

These new capabilities may allow the two services to exchange messages related to auto DR activity. Messaging may facilitate a shift of demand response monitoring and management to the enterprise level. It is no longer necessary to perform these tasks on a site-by-site basis.

Each site controller may transmit updates to the EMCS supervisor concerning: 1) auto DR events received from an auto DR system; 2) Changes in event status (i.e., when an event transitions from pending to active); and 3) EMCS performance during an auto DR event (i.e., actual electrical load being shed).

By receiving these updates, the EMCS supervisor may be able to collect auto DR activity data for the entire enterprise. This data may then be available for viewing in a format appropriate to a particular user's needs.

A user might view all automated demand response programs in which sites are participating. The program view may show the cumulative performance of all participating sites; this may allow the user to easily note the energy and cost savings being realized from participation in a particular auto DR program. Each program may be expanded to show the enrolled sites as well as the latest event status (i.e., the currently active event and/or pending events). Viewing the individual sites may allow the user to easily detect any site which is not meeting the expected levels of reduction in electricity usage.

Collection of the auto DR performance data may enable not only real-time monitoring but also more advanced data analysis. Energy and financial analytics may be performed for auto DR programs, geographic regions, or individual sites over various time periods (i.e., daily, weekly, monthly, and so forth). Possible metrics may include realized energy savings and cost benefits of program participation.

Additionally, the EMCS supervisor may provide several options for managing event response. A view of the programs in which sites are enrolled may allow a user to see upcoming demand response events. At the user's discretion, the enterprise may elect not to participate in a scheduled event. If an event opt-out action is initiated, the supervisor may have the ability to send a notification to each enrolled site. Some circumstances may require that an individual site not reduce electrical load. In this case, the user may invoke a site opt-out and the supervisor may send a notification only to the affected site.

In the first and second approaches, a demand response strategy may be deployed to each EMCS site controller. Execution of that strategy may be triggered by an auto DR event. To reduce demand, this strategy may involve controlling HVAC equipment to higher setpoints. Supporting automated demand response in this manner may increase the complexity and cost of maintaining the enterprise EMCS. Any changes to the demand response strategy may require re-programming of each EMCS site controller. The batch service may reduce the complexity of making the setpoint change and the time required to deploy the change across the enterprise. One may note U.S. patent application Ser. No. 12/703,476, filed Feb. 10, 2010, and entitled "A Multi-Site Controller Batch Update System". U.S. patent application Ser. No. 12/703,476, filed Feb. 10, 2010, is hereby incorporated by reference.

A first version of the third approach may be built as in the following. 1) Configure the EMCS supervisor. 2) Add the auto DR supervisor service component to the EMCS supervisor. The auto DR monitor component may now be available.

An additional configuration of the supervisor service is shown relative to the second approach. 3) Configure the EMCS site controller. 4) Add the auto DR service component to the site controller. 5) Configure the monitor host. This may identify the EMCS supervisor which will receive auto DR-related messages from the site controller.

An additional configuration of the service is shown relative to the first and second approaches.

When the EMCS site controller's auto DR service receives an event message, the event may be communicated to the selected EMCS supervisor. At the supervisor, the event may be added to the activity monitor where the event details are available for viewing and management decision-making.

If a user elects to opt-out of an event for virtually all participants or individual sites, the appropriate notification may be sent to the affected site controllers. Upon receipt of the opt-out notice, the site service may respond accordingly and send a feedback message to the supervisor.

As the EMCS site controller responds to a demand response event, electrical loads may be shed; this may involve adjustments to temperature setpoints, dimming or turning off lights, or other modifications to the building systems which reduce the demand of electrical loads. During the auto DR event, information about electrical load usage levels, the amount of electrical load being shed or other demand response metrics may be propagated to the client's event feedback component (shown relative to the first approach). This feedback may be transmitted to the selected EMCS supervisor. The supervisor may use the feedback data to update both site and program performance metrics.

FIGS. 1-6 may relate to the first approach. FIG. 1 is a diagram of an automated demand response architecture. At symbol 11, a utility/ISO may have an information system that provides information such as a configure auto DR program, update pricing information, initiate auto DR event, modify auto DR event, and so forth to an auto DR system as represented by symbol 13. The information may proceed from the utility/ISO to the auto DR system via a medium such as an internet 12 or other medium. Information, such as configure auto DR service connection, may be provided by a participant site at symbol 14. The participant site may have an EMCS with auto DR service. An auto DR event may be sent by auto DR system at symbol 13 to the participant site. The participant site at symbol 14 may provide auto DR event feedback to the auto DR system. Such information and other information may be exchanged via the internet 12 or some other medium.

Figure 2:
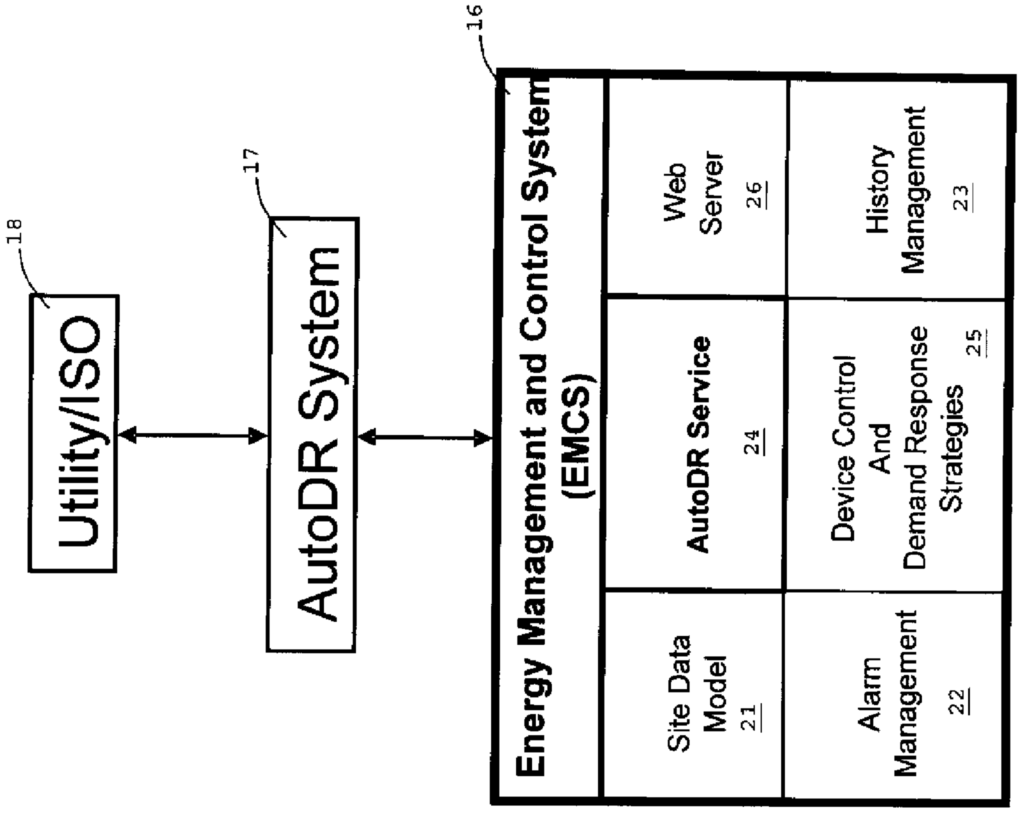
FIG. 2 is a diagram of an example energy management and control system framework with automated demand response service.

FIG. 2 is a diagram of an example EMCS framework with auto DR service, as shown in symbol 16. The EMCS may also have a site data model, web server, alarm management, device control and demand response strategies, history management, and so forth. The EMCS 16 may be connected to an auto DR system at symbol 17. The auto DR system may be connected to a utility/ISO at symbol 18.

Figure 3:
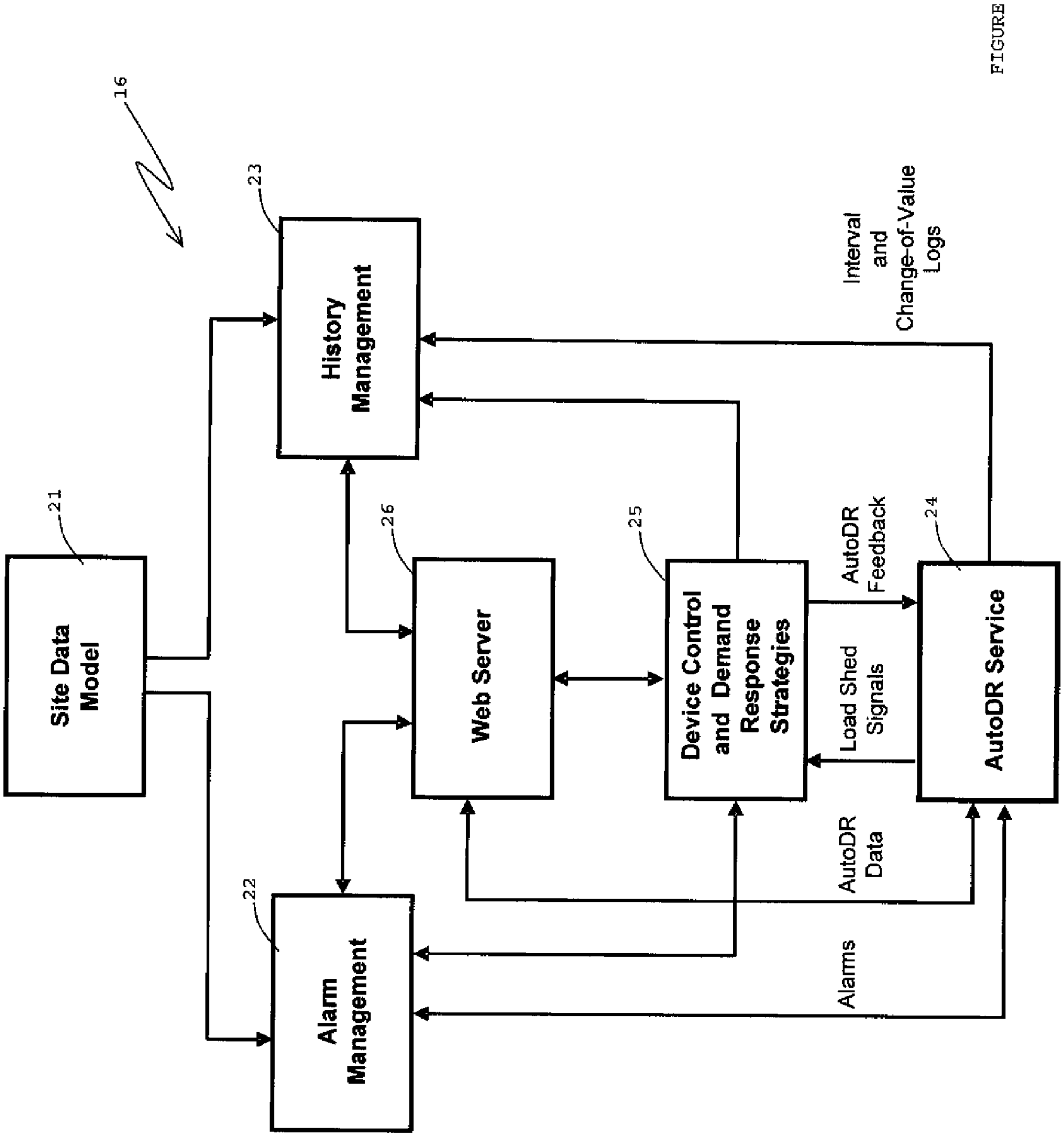
FIG. 3 is a diagram of energy management and control system components with an automated demand response data flow of an energy management and control system.

FIG. 3 is a diagram of EMCS components with auto DR data flow of EMCS 16. Information of a site data model at symbol 21 may be provided to alarm management at symbol 22 and history management at symbol 23. An auto DR service at symbol 24 may be connected to alarm management at symbol 22 for conveyance of alarm information either way and connected to history management at symbol 23 for providing interval and change-of-value log information to the history management. Device control and demand response strategies at symbol 25 may be connected to alarm management at symbol 22 and history management at symbol 23. Auto DR service at symbol 24 may be connected to device control and demand response strategies at symbol 25 to load shed signals to device control and demand response strategies and to receive auto DR feedback from device control and demand response strategies. A web server at symbol 26 may be connected to auto DR service at symbol 24 for exchanging auto DR data. The web server may also be connected to device control and demand response strategies at symbol 25, alarm management at symbol 22 and history management at symbol 23.

Figure 4:
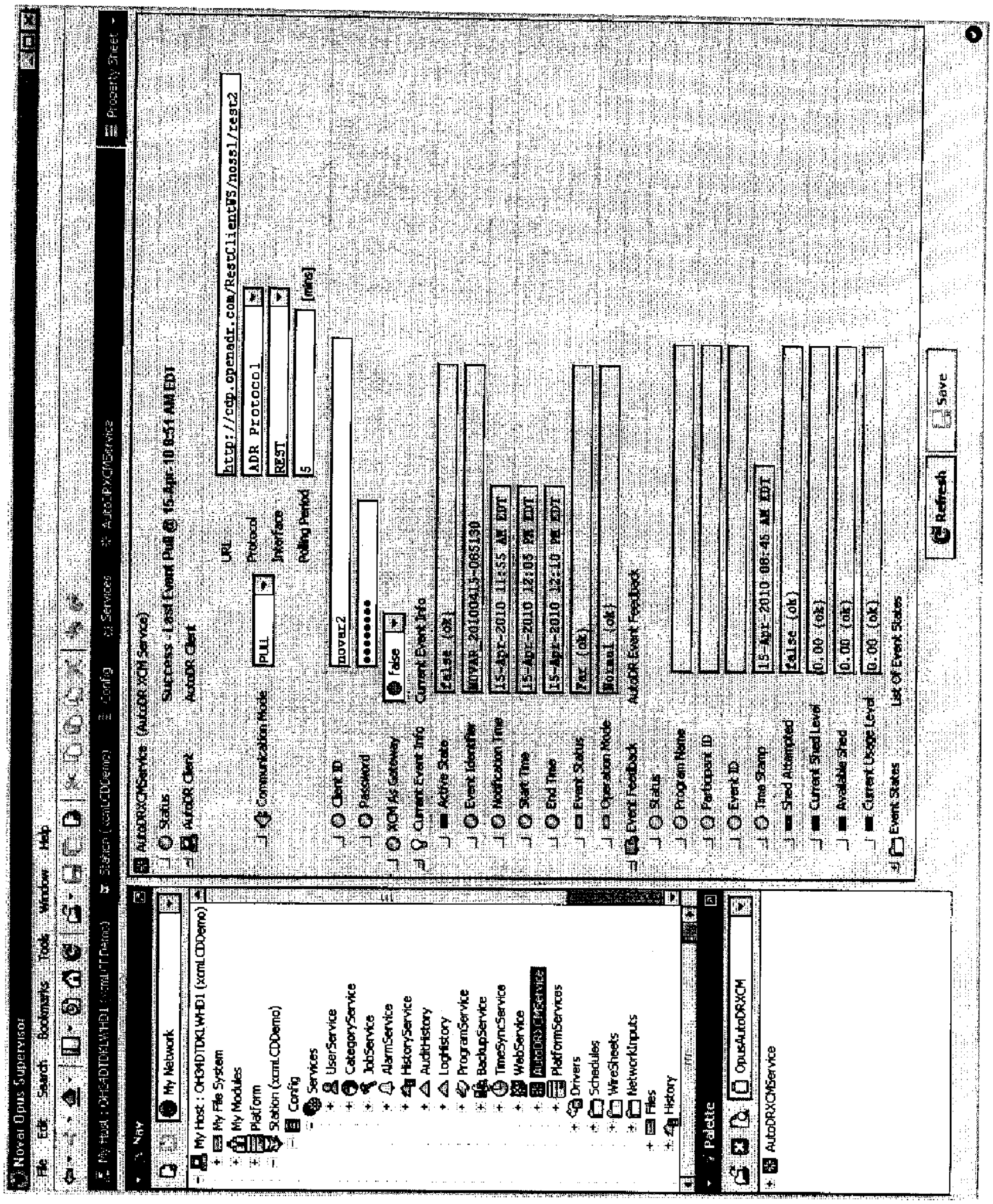
FIG. 4 is a screen print of a display showing an automated demand response service component in an energy management and control system site controller.

FIG. 4 is a screen print of a display 28 showing an auto DR service component in an EMCS site controller. Display 28 may reveal information such as status, client, current event, event feedback, event state, and so on.

Figure 5:
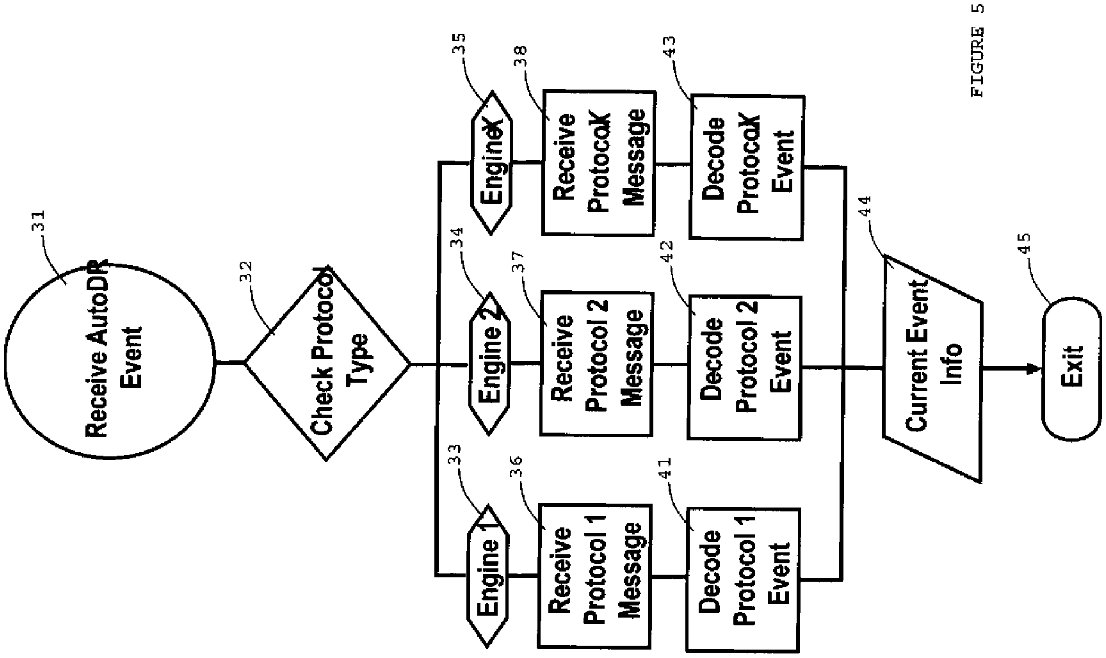
FIG. 5 is a diagram of activity for a receive automated demand response event.

FIG. 5 is a diagram of activity for a receive auto DR event. Upon a receive auto DR event at symbol 31, there may be a check protocol type at symbol 32. The event may go to one or more engines 1, 2, . . . , X at symbols 33, 34 and 35, respectively, depending on its protocol type. Outputs from symbols 33, 34 and 35 may go the symbols 36, 37 and 38, respectively, indicating receive protocol 1 message, receive protocol 2 message and receive protocol X message. Outputs from protocol decoded items of symbols 41, 42 and 43 may flow as current event information to symbol 44. This flow may exit at symbol 45. "X" may represent virtually any number.

Figure 6:
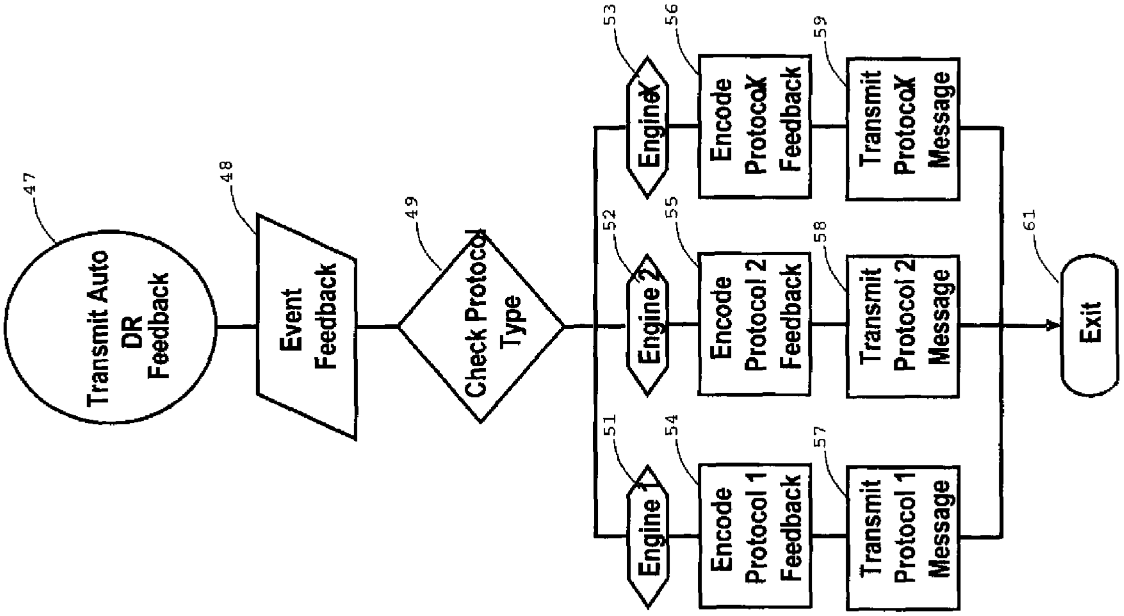
FIG. 6 is a diagram of activity from a transmit automated demand response feedback.

FIG. 6 is a diagram of activity from a transmit auto DR feedback at symbol 47. Upon a transmit auto DR feedback, there may be an event feedback at symbol 48. There may be a check protocol type of the feedback at symbol 49. From symbol 49, the information may go to one or more engines 1, 2, . . . , X at symbols 51, 52 and 53, respectively. From a respective engine, the feedback may be encoded at symbols 54, 55 and 56, respectively, for protocol 1, protocol 2 and/or protocol X. From symbols 54, 55 and 56, the encoded feedback may go to symbols 57, 58 and 59, respectively, to be transmitted as a protocol 1 message, a protocol 2 message and/or a protocol X message. The activity may be exited at symbol 61. "X" may represent virtually any number.

FIG. 7a is an example program 198 of a sample auto DR event. FIG. 7b is another example program 199 of a sample auto DR event.

Figure 8:
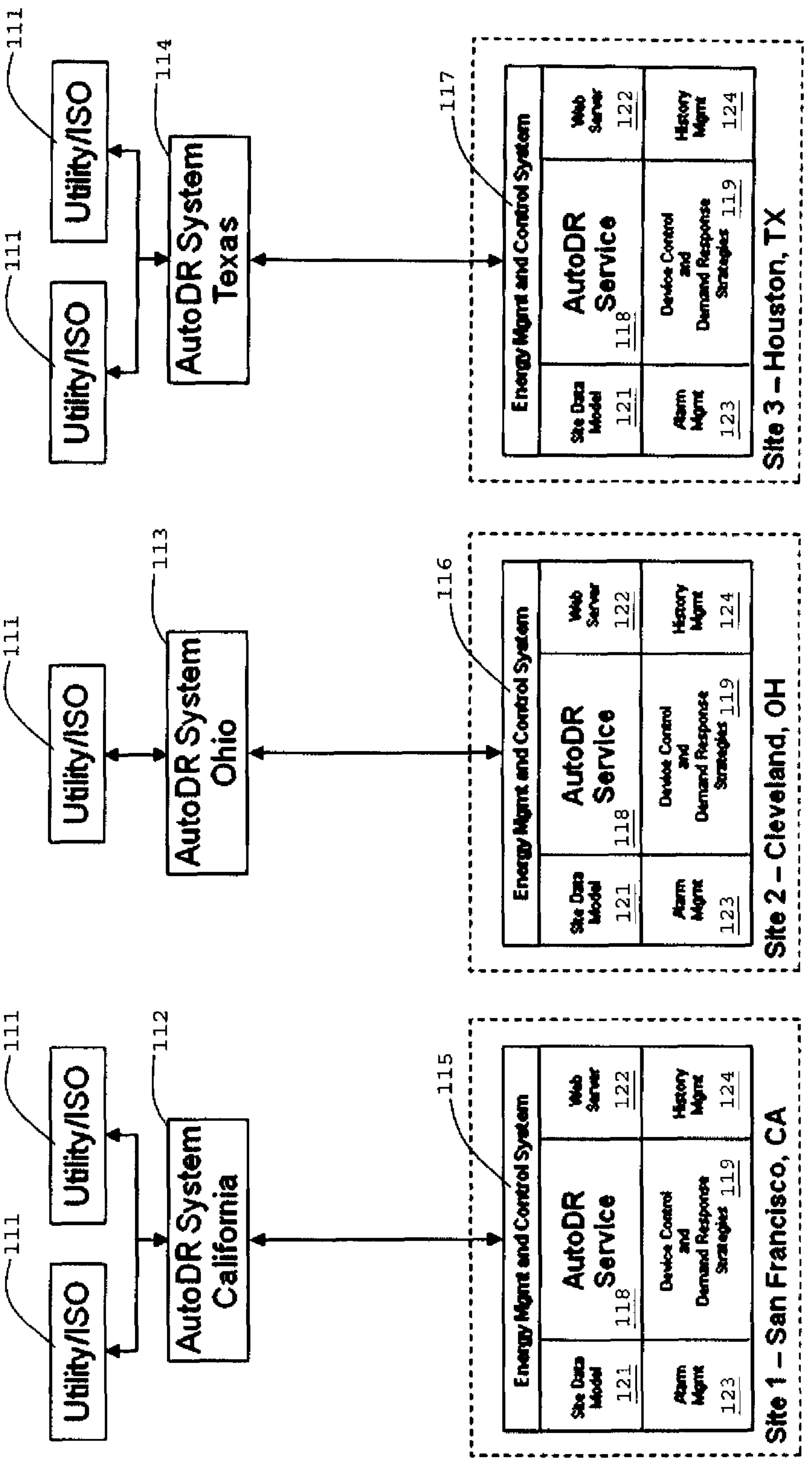
FIG. 8 is a diagram of a sample automated demand response deployment.

FIG. 8 is a diagram of a sample auto DR deployment. There may be one or more utility/ISOs 111 for each of one or more regions in the country or world. For example, there may be utility/ISOs 111 having a two-way connection to an auto DR system 112 in California, a utility/ISO 111 having a two-way connection to an auto DR system 113 in Ohio, and utility/ISOs 111 having a two-way connection to an auto DR system 114 in Texas. Systems 112, 113 and 114 may have a two-way connection to an energy management and control system 115 at a site 1 in San Francisco, Calif., an energy management and control system 116 at a site 2 in Cleveland, Ohio, and an energy management and control system 117 at a site 3 in Houston, Tex. Each of the energy management and control systems 115, 116 and 117, may have an auto DR service module 118 with an associated device control and demand response strategies module 119, site data model module 121, web server module 122, alarm management module 123 and history management module 124. Each auto DR service module 118 may contain a processing engine for each auto DR system 112, 113 and 114.

Figure 9:
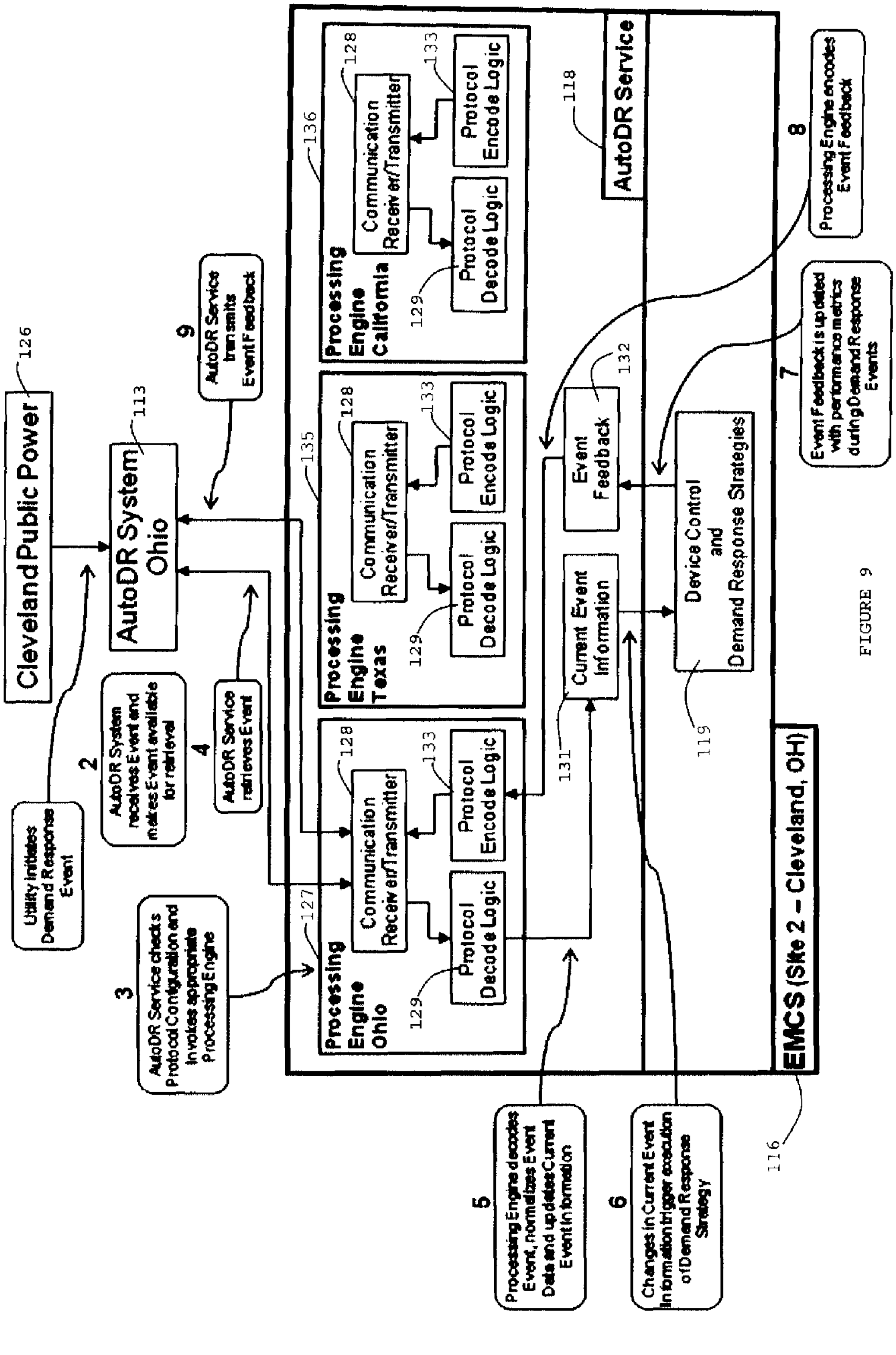
FIG. 9 shows an example automated demand response flow diagram.

FIG. 9 shows an example auto DR flow diagram. A Cleveland public power utility 126 of site 2 may be one of the utility/ISOs 111 in FIG. 8. Utility 126 may initiate a demand response event which goes to an auto DR system 113 in Ohio. The auto DR system 113 may receive the event and make the event available for retrieval. Auto DR service 118 may check protocol configuration of the event and invoke the appropriate processing engine. Auto DR service 118 may retrieve the event which goes to a communication receiver/transmitter 128 in an appropriate processing engine 127 for Ohio. Processing engine 127 may decode the event at protocol decode logic 129, normalize event data and update current event information at symbol 131. Changes in current event information at symbol 131 may trigger an execution of a demand response strategy at device control and demand response strategies at symbol 119. Upon execution of the strategy, event feedback at symbol 132 may be updated with performance metrics during demand response events. Protocol encode logic 133 may encode the event feedback. The encoded feedback may go via the communication receiver/transmitter 128 of processing engine 127 at auto DR service 118 and be transmitted to the auto DR system 113 for Ohio. Auto DR service 118 may in the present illustrative example incorporate a processing engine 135 for Texas and a processing engine 136 for California. Each of the processing engines 135 and 136 may have a communication receiver/transmitter 128, a protocol decode logic 129 and a protocol encode logic 133. In the case of a public power facility in Texas or California, the respective facility may be connected to an auto DR system which in turn may be connected through a respective processing engine, an auto DR service module and a device control and demand response strategies module in a similar manner as described for the Ohio public power facility.

Figure 10:
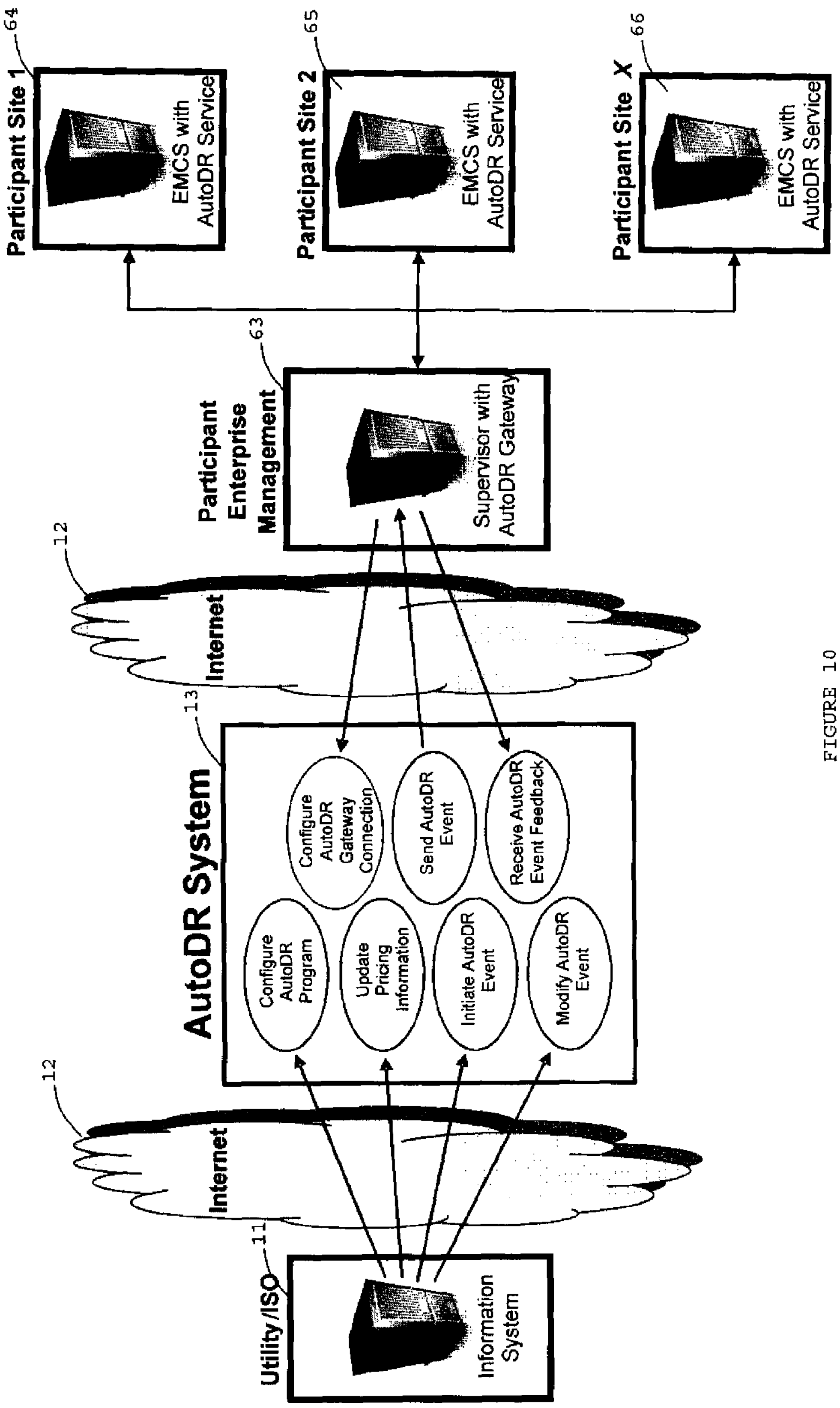
FIG. 10 is a diagram of another version of automated demand response architecture relative to the architecture shown in FIG. 1.

FIGS. 10-19 may relate to the second approach. FIG. 10 is a diagram of another version of an automated demand response architecture relative to the architecture shown in FIG. 1. At symbol 11, a utility/ISO may have an information system that provides information such as configure auto DR program, update pricing information, initiate auto DR event, modify auto DR event, and so forth to an auto DR system as represented by symbol 13. The information may proceed from the utility/ISO to the auto DR system via a medium such as an internet 12 or other medium. Information, such as configure auto DR gateway connection may be provided by a participant enterprise management at symbol 63. The participant management may have a supervisor with an auto DR gateway at symbol 63. An auto DR event may be sent by the auto DR system at symbol 13 to the participant enterprise management. The management at symbol 63 may provide auto DR event feedback to the auto DR system at symbol 13. Such information and other information may be exchanged via the internet 12 or some other medium.

The participant enterprise management at symbol 63 may be connected to a participant site 1 at symbol 64, a participant site 2 at symbol 65 and a participant site X at symbol 66. "X" means that management at symbol 63 may be connected to virtually any number of participant sites. Each participant site may consist of an EMCS with auto DR service.

Figure 11:
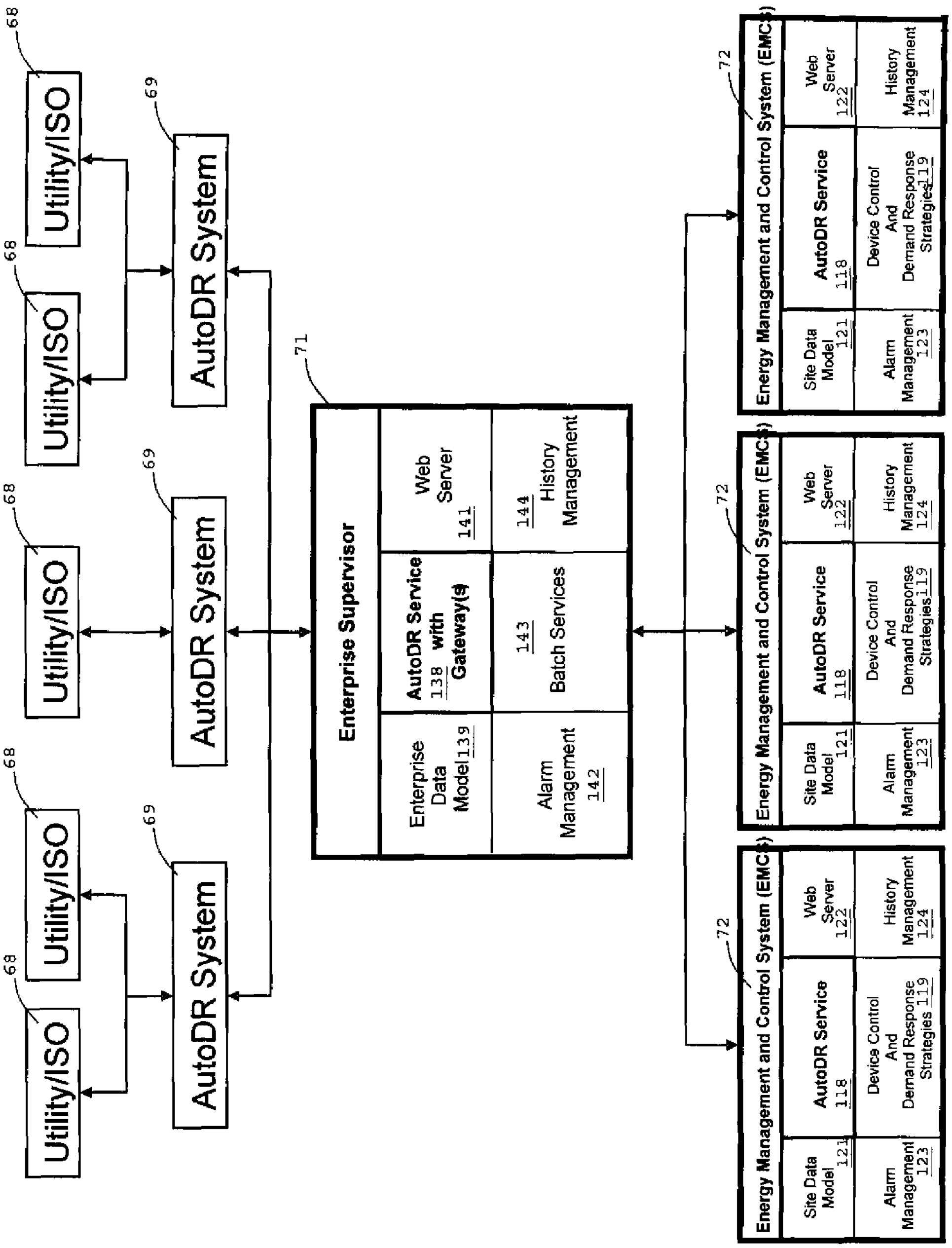
FIG. 11 is a diagram of an enterprise framework with one or more automated demand response gateways.

FIG. 11 is a diagram of an enterprise framework with one or more auto DR gateways. There may be one or more utility/ISOs represented by symbols 68 connected to an auto DR system represented by a symbol 69. One or more auto DR systems may be connected to an enterprise supervisor as represented by a symbol 71. The enterprise supervisor may consist of an auto DR service 138 with one or more gateways. The supervisor may also consist of an enterprise data model 139, a web server 141, alarm management 142, batch services 143, history management 144, and so forth. The supervisor at symbol 71 may be connected to one or more energy management and control systems (EMCSs) 72. Each EMCS may consist of an auto DR service 118. An EMCS may also consist of a site data model 121, a web server 122, alarm management 123, device control and demand response strategies 119, history management 124, and so forth.

Figure 12:
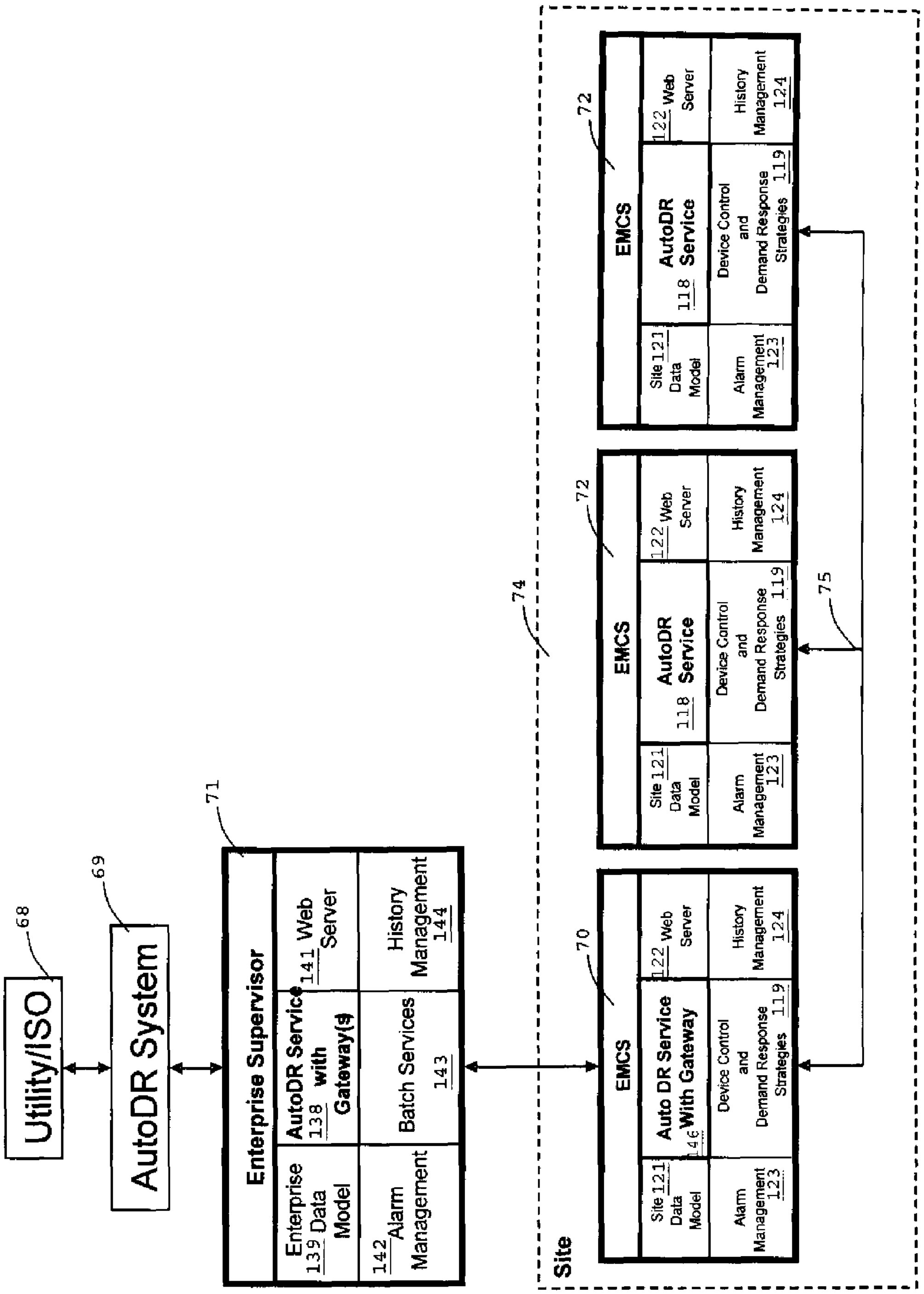
FIG. 12 is a diagram of an enterprise and site frameworks with one or more automated demand response gateways.

FIG. 12 is a diagram of an enterprise and site frameworks with one or more auto DR gateways. A utility/ISO at symbol 68 may be interconnected with an auto DR system at symbol 69. The auto DR system may be interconnected with an enterprise supervisor at symbol 71. The enterprise supervisor may consist of an auto DR service 138 with one or more gateways. The supervisor at symbol 71 may also consist of an enterprise data model 139, a web server 141, alarm management 142, batch services 143, history management 144, and so forth. The supervisor may be interconnected with a site 74. The connection may be with one EMCS at a symbol 70. The EMCS may incorporate an auto service 146 with a gateway. The EMCS at symbol 70 may also incorporate device control and demand response strategies 119, site data model 121, web server 122, alarm management 123, history management 124, and so forth. The EMCS may be interconnected with one or more additional EMCSs at symbols 72. The interconnection may be represented by lines 75. Each EMCS at symbol 72 may consist of an auto DR service 118, a site data model 121, a web server 122, alarm management 123, device control and demand response strategies 119, history management 124, and so forth.

Figure 13:
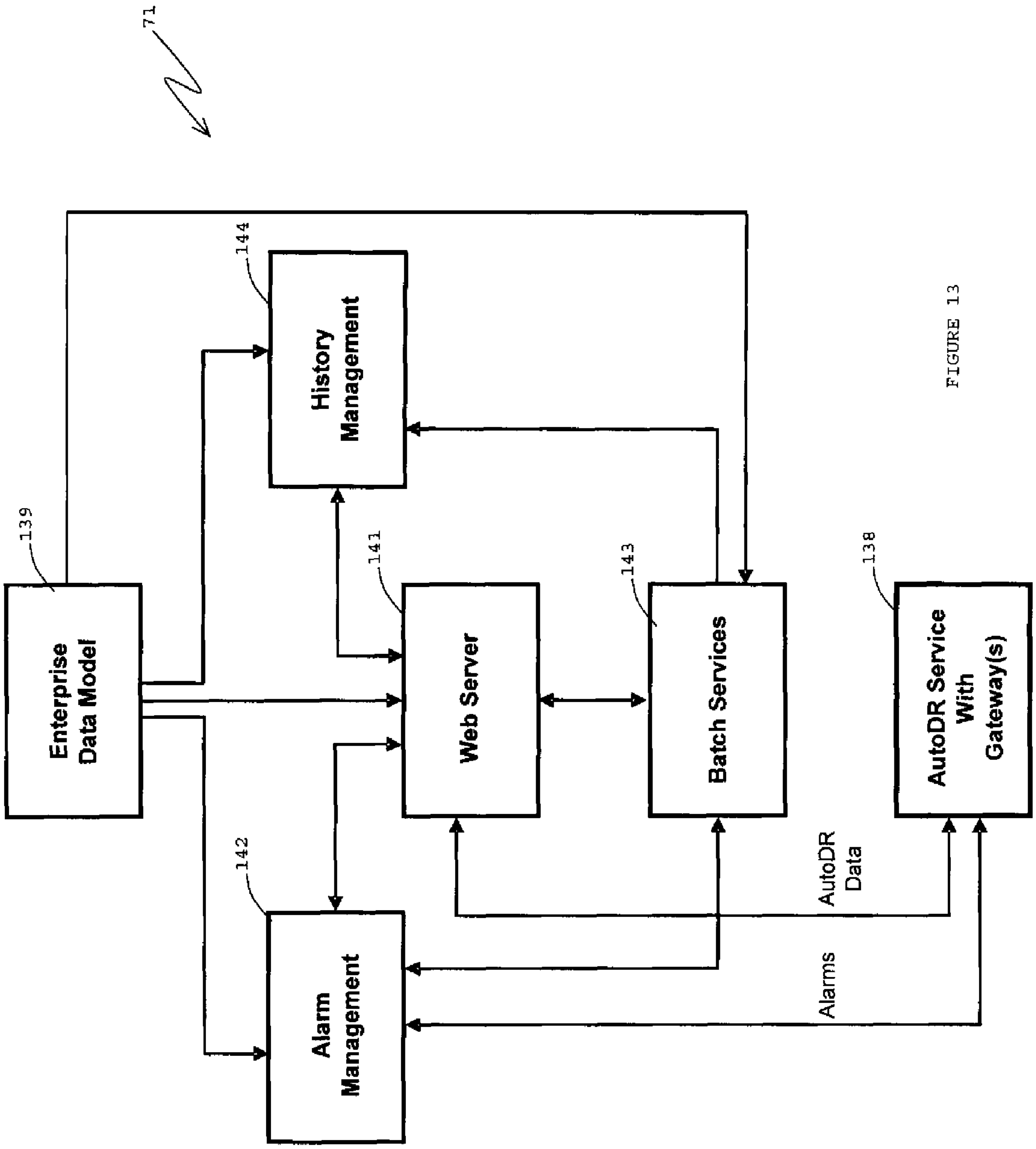
FIG. 13 is a diagram of energy management and control system supervisor components with an automated demand response data flow.

FIG. 13 is a diagram of EMCS supervisor components with an auto DR data flow. FIG. 13 may be similar to FIG. 3 except that the latter Figure may relate to an EMCS at symbol 16 instead of an EMCS supervisor at symbol 71. An enterprise data model at symbol 139 may be provided to alarm management at symbol 142 and history management at symbol 144. An auto DR service with one or more gateways at symbol 138 may be connected to alarm management at symbol 142 for conveyance of alarm information either way. Batch services at symbol 143 may be connected to alarm management at symbol 142, history management at symbol 144 and the enterprise data model at symbol 139. A web server at symbol 141 may be connected to auto DR service at symbol 138 with one or more gateways for exchanging auto DR data. The web server may also be connected to batch services at symbol 143, alarm management at symbol 144, history management at symbol 144 and the enterprise data model at symbol 139.

Figure 14:
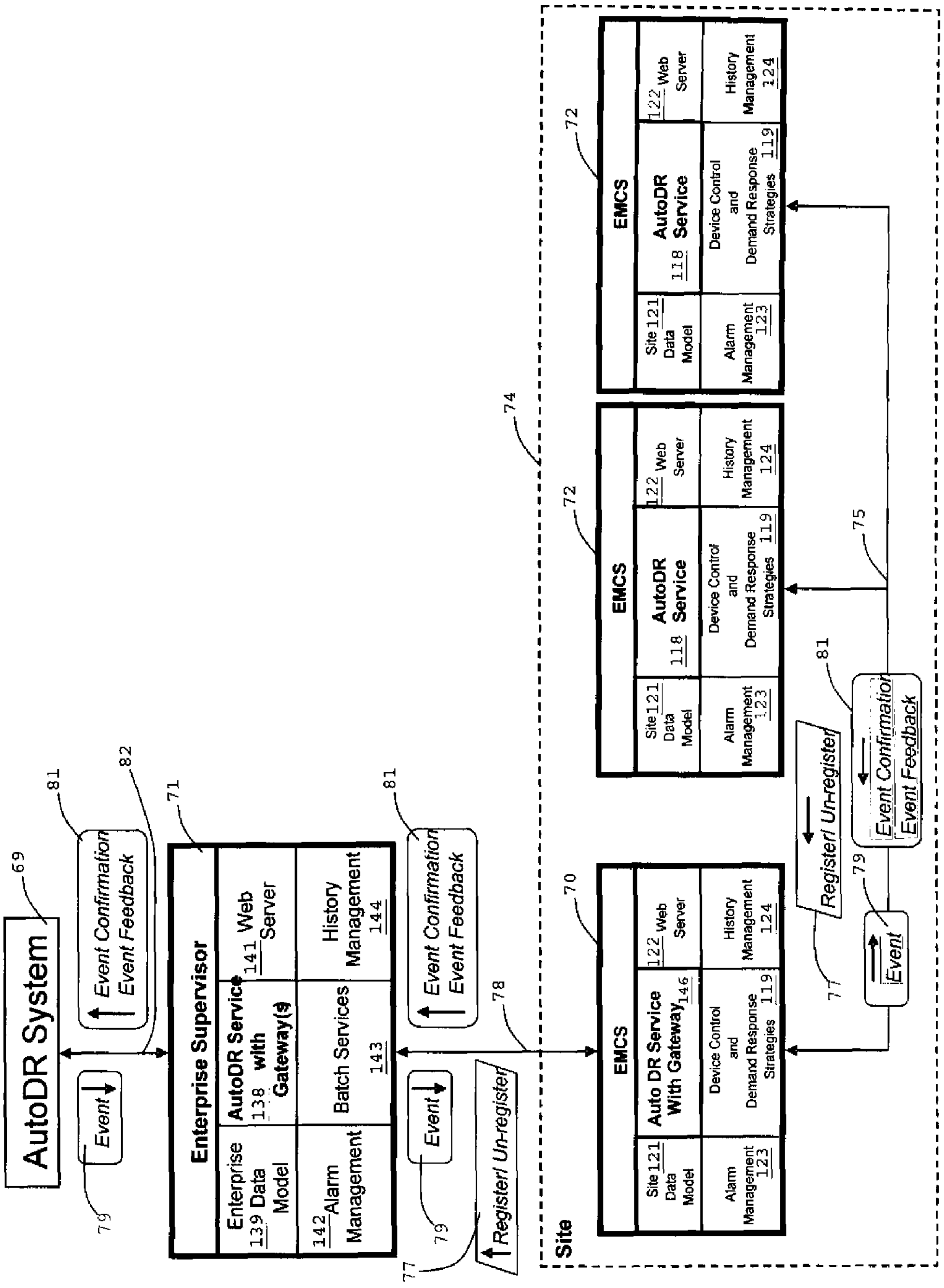
FIG. 14 is a diagram of enterprise and site frameworks with an automated demand response data flow.

FIG. 14 is a diagram of enterprise and site frameworks with auto DR data flow. The diagram appears similar to the diagram of FIG. 12 except that the utility/ISO is not necessarily shown and flows of information of the interconnections are indicated. An EMCS may be registered or unregistered as indicated by a label 77. The register or unregister may be initiated at an EMCS and proceed to the enterprise supervisor 71 via a line 78. If the register or unregister may be initiated by an EMCS 72 not directly connected to the supervisor via line 78, it may proceed along line 75 to the EMCS at symbol 70 connected to the enterprise supervisor 71. Event confirmation indicated by a label 81 may proceed from auto DR system at symbol 69 to the enterprise supervisor at symbol 71, via a connection represented by a line 82. From the enterprise supervisor at symbol 71, the event information may proceed along a connection indicated by line 78 to a site at symbol 74. The event information along the connection may initially go to an EMCS at symbol 70 immediately connected by line 78 to symbol 71 representing the enterprise supervisor. If the event information is meant to be for one or more of the EMCSs at the symbols 72, it may go to the respective EMCS via the connection represented by line 75. From the one or more EMCSs at symbols 72 to which the event information went, an event confirmation or event feedback, as indicated by a label 81, may be returned from the one or more EMCS's at symbols 72, not directly connected to the enterprise supervisor at symbol 71, along a connection represented by line 75, the EMCS at symbol 70 directly connected to the supervisor, line 78, the supervisor at symbol 71, and line 82 to symbol 69 representing the auto DR system. If the event confirmation or event feedback indicated by label 81 is from the EMCS at symbol 70 directly connected to the enterprise supervisor, the event confirmation or event feedback may proceed along a connection represented by line 78, the supervisor at symbol 71 and line 82 to the auto DR system represented by symbol 69.

Figure 15:
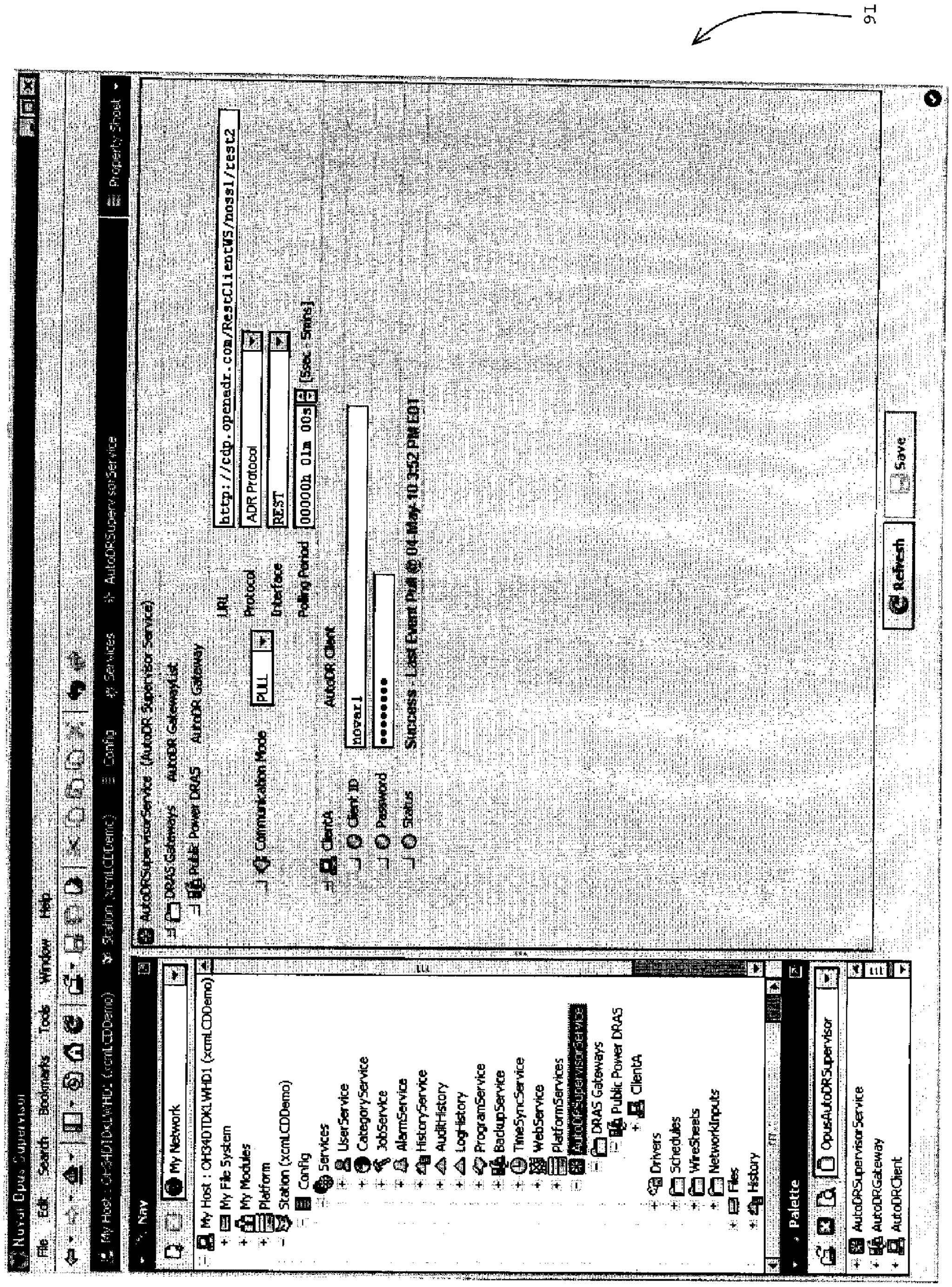
FIG. 15 is a diagram of a screen print of a display for automated demand response supervisor service components in an energy management and control system supervisor.

FIG. 15 is a diagram of a screen print 91 of a display for auto DR supervisor service components in an EMCS supervisor. One of the items in print 91 may incorporate gateway information relative to auto DR supervisor service.

Figure 16:
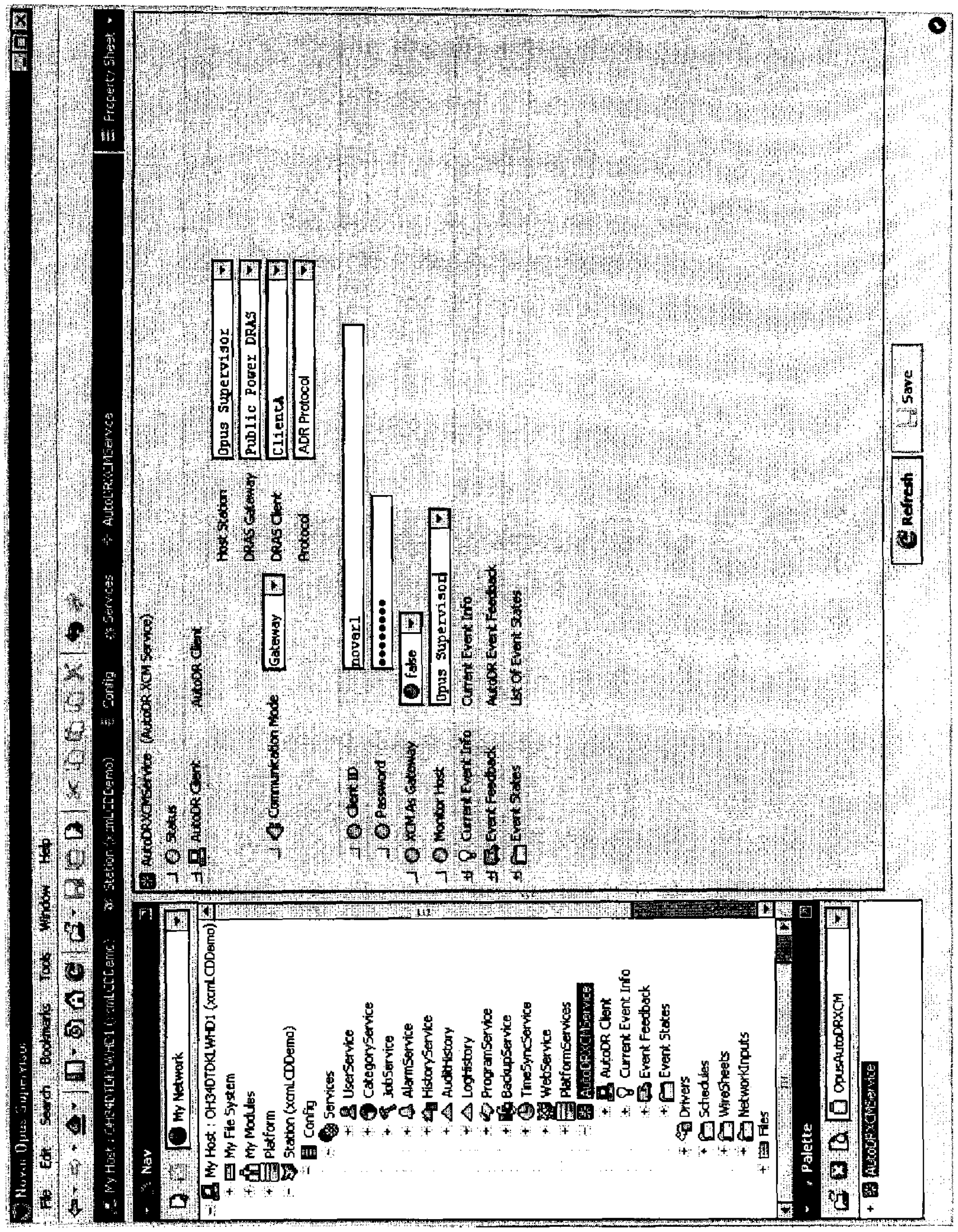
FIG. 16 is a diagram of a screen print of a display for automated demand response service components in an energy management and control system site controller.

FIG. 16 is a diagram of a screen print 92 of a display for auto DR service components in an EMCS site controller. Some items in the display may include information about status, the client, monitor host, current events, event feedback, event states, and so on.

Figure 17:
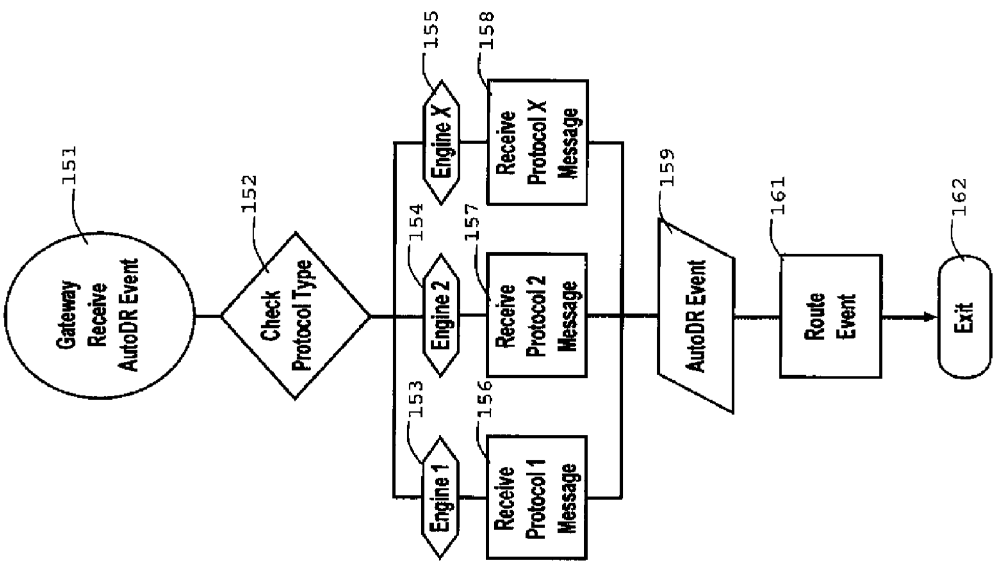
FIG. 17 is a flow diagram of activity for a gateway receive automated demand response event.
Figure 18:
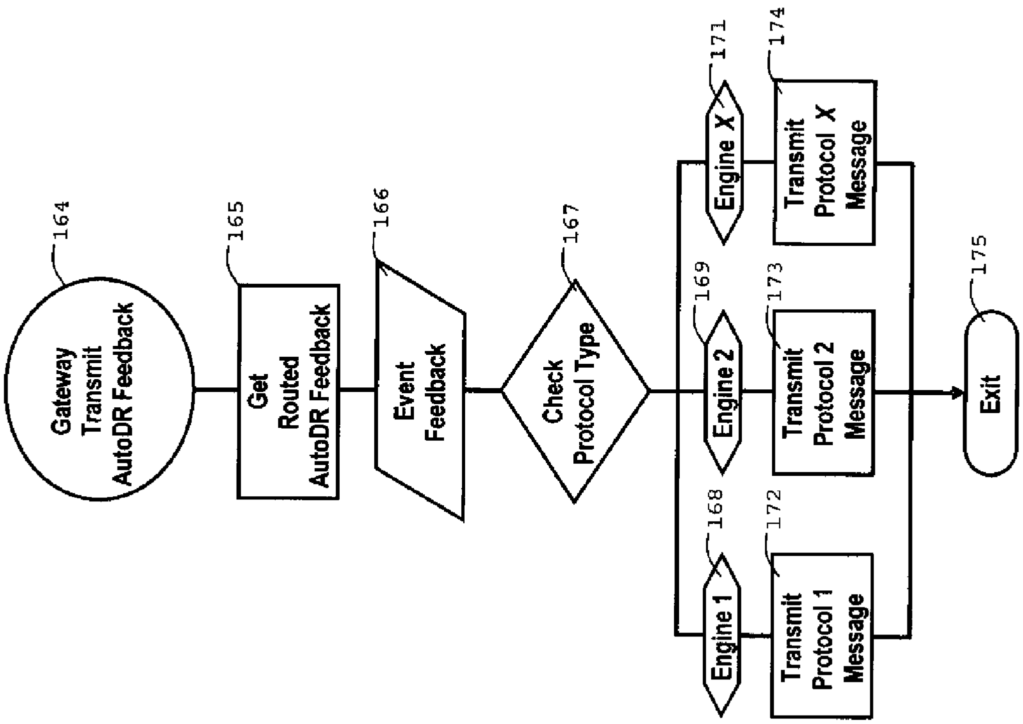
FIG. 18 is a flow diagram of activity for a gateway transmit automated demand response feedback.

FIGS. 17 and 18 are diagrams of activity for a gateway receive auto DR event and of activity for a gateway transmit auto DR feedback, respectively. A gateway may receive an auto DR event at symbol 151. Protocol type of the event may be checked at symbol 152. The event may be directed to one of the engines 153, 154 and 155. Engine 155 may be engine X which may be an nth engine in that the number of engines may be greater than the three shown in the Figure. From at least one of these engines, the event may go to a symbol 156, 157 and/or 158 for receiving messages of protocols 1, 2 and so on of protocol X which may be the nth protocol in that the number of protocols may be greater than the three shown in the Figure. An auto DR event 159 may go from at least one of the receive protocol message symbols to a route event at symbol 161. The routed event may exit the diagram at symbol 162.

In FIG. 18, there may be a gateway transmit auto DR feedback at symbol 164 which is to get routed as auto DR feedback at symbol 165 which is event feedback at symbol 166. The protocol type of the event feedback may be checked at symbol 167. The event feedback may go to at least one of the engines 1, 2 or X as indicated by symbols 168, 169 and 171, respectively. Engine X which may be an nth engine in that the number of engines may be greater than the three shown in the Figure. From at least one of the engines, as represented by symbols 168, 169 and 171, the feedback may go one or more of symbols 172, 173 and 174, to be transmitted as a protocol 1, 2 or X message, respectively. Protocol X is the nth protocol in that the number of protocols may be greater than the three shown in the Figure.

Figure 19:
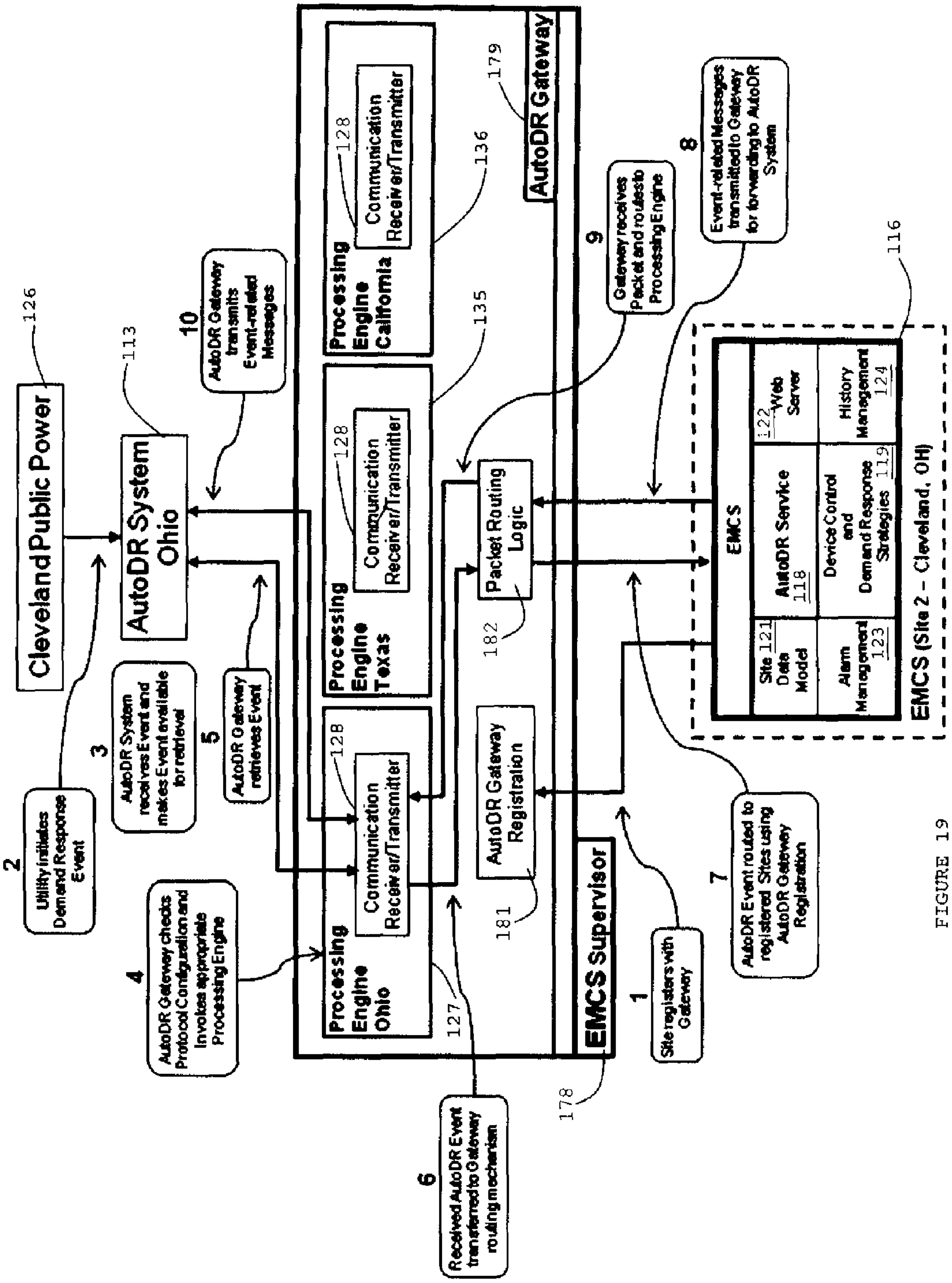
FIG. 19 is a flow diagram of an automated demand response gateway.

FIG. 19 is a flow diagram of an auto DR gateway. An example EMCS 116 at, for example, a site 2 of Cleveland, Ohio, may register with an auto DR gateway 179 of EMCS supervisor 178 at symbol 181. A utility 126, for instance, Cleveland public power may initiate a demand response event which is received by an auto DR system of Ohio at symbol 113. The auto DR system may make the event available for retrieval. The auto DR gateway 179 may check the protocol configuration of the event and invoke an appropriate processing engine 127. Gateway 179 may retrieve the event which goes to a communication receiver/transmitter of engine 127. The received auto DR event may be transferred to a gateway routing mechanism and a packet routing logic 182. The received auto DR event may be routed to registered sites, such as a site at Cleveland, Ohio, using the auto gateway registration at symbol 181. The event may go to EMCS 116. From the EMCS at the Cleveland site, event-related messages (i.e., a packet) may be transmitted to gateway 179 for forwarding to auto DR system 113. The packet may be routed by logic 182 to the communication receiver/transmitter 128 of processing engine 127. The packet of event-related messages may be transmitted from the processing engine of auto DR gateway 179 to the auto DR system 113.

Figure 20:
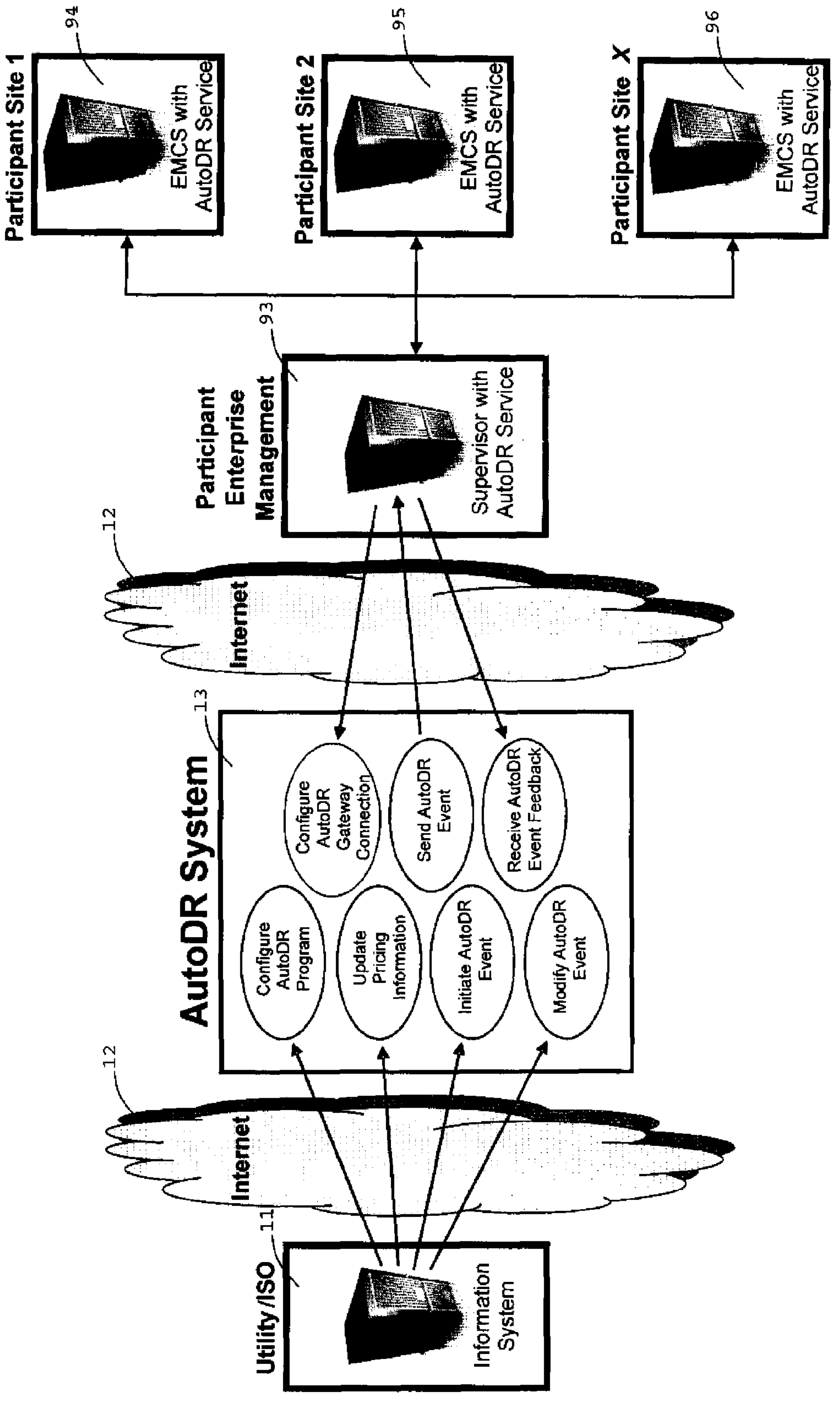
FIG. 20 is a diagram of another version of automated demand response architecture relative to the versions of architecture shown in FIGS. 1 and 10.

FIGS. 20-25 may relate to the third approach. FIG. 20 is a diagram of another version of an automated demand response architecture relative to the versions of the architecture shown in FIGS. 1 and 10. At symbol 11, a utility/ISO may have an information system that provides information such as configure auto DR program, update pricing information, initiate auto DR event, modify auto DR event, and so forth to an auto DR system as represented by symbol 13. The information may proceed from the utility/ISO to the auto DR system via a medium such as an internet 12 or other medium. Information, such as configure auto DR gateway connection may be provided by a participant enterprise management at symbol 93. The participant management may have a supervisor with auto DR service at symbol 93. An auto DR event may be sent by the auto DR system at symbol 13 to the participant enterprise management. The management at symbol 93 may provide auto DR event feedback to the auto DR system at symbol 13. Such information and other information may be exchanged via the internet 12 or some other medium.

The participant enterprise management at symbol 93 may be connected to a participant site 1 at symbol 94, a participant site 2 at symbol 95 and a participant site X at symbol 96. "X" may represent a number means that management at symbol 93 may be connected to virtually any number, not just the three in the Figure, of participant sites. Each participant site may consist of an EMCS with auto DR service.

Figure 21:
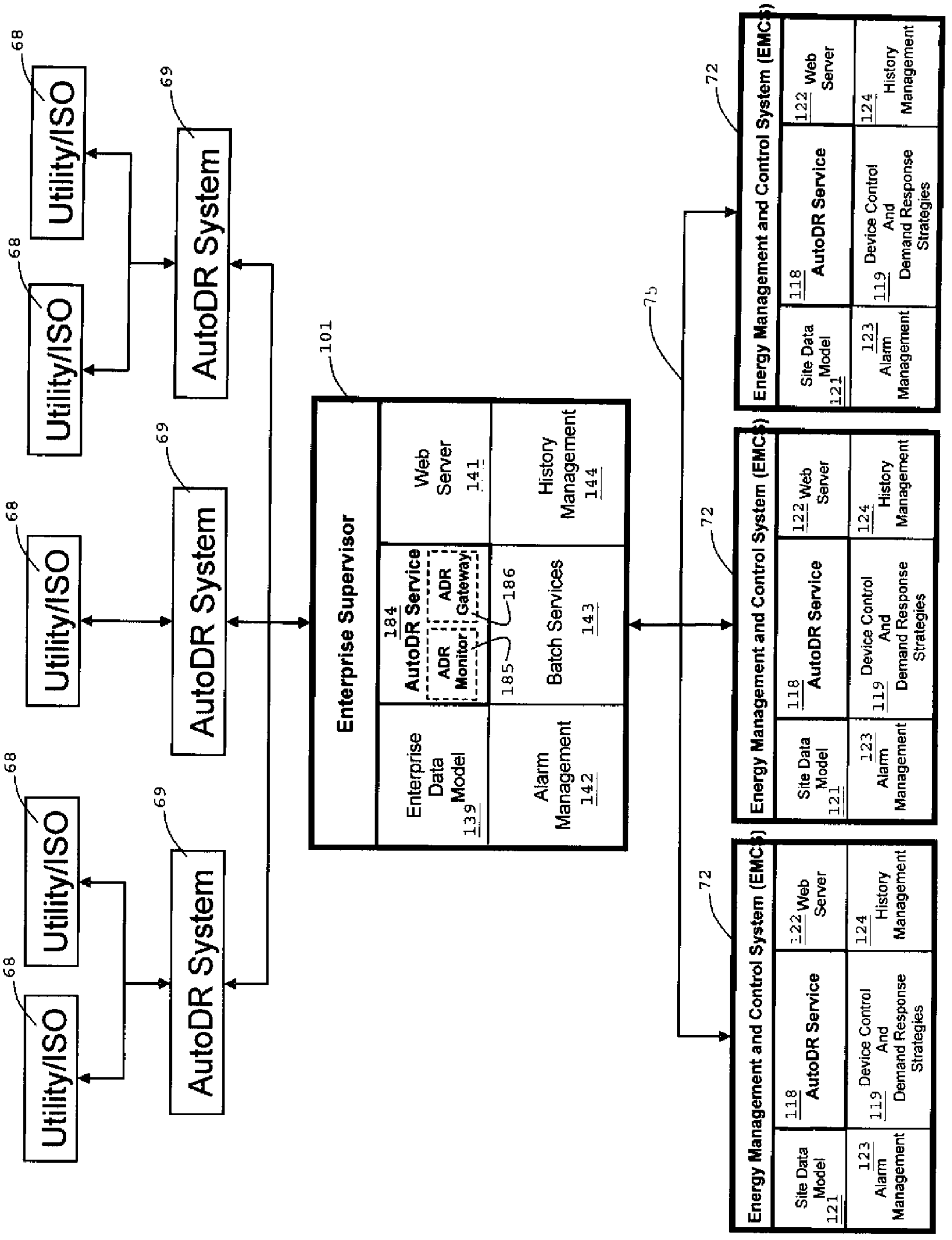
FIG. 21 is a diagram of an enterprise framework with automated demand response services.

FIG. 21 is a diagram of an enterprise framework with auto DR services. This Figure may appear similar to FIG. 11, which is a diagram of an enterprise framework with one or more auto DR gateways. The diagram of FIG. 21 may have one or more utility/ISOs represented by symbols 68 connected to an auto DR system represented by a symbol 69. One or more auto DR systems may be connected to an enterprise supervisor as represented by a symbol 101. The enterprise supervisor may consist of an auto DR service 184 with an ADR monitor 185 and an ADR gateway 186. The supervisor at symbol 101 may also consist of an enterprise data model 139, a web server 141, alarm management 142, batch services 143, history management 144, and so forth. The supervisor at symbol 101 may be connected to one or more energy management and control systems (EMCSs) 72 via a line 75. Each EMCS 72 may consist of an auto DR service 118. An EMCS 72 may also consist of a site data model 121, a web server 122, alarm management 123, device control and demand response strategies 119, history management 124, and so forth.

Figure 22:
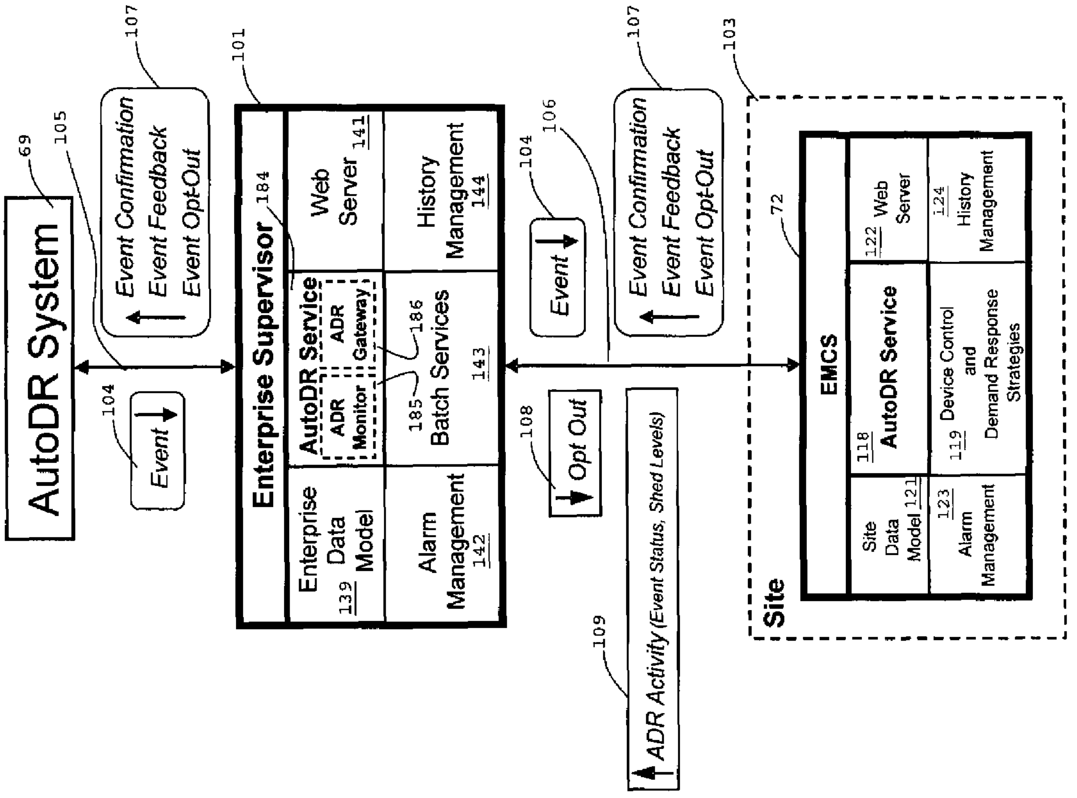
FIG. 22 is a diagram of an enterprise and site framework with an automated demand response data flow.

FIG. 22 is a diagram of an enterprise and site framework with an auto DR data flow. This Figure may have some resemblance to FIG. 14. FIG. 22 may also have some resemblance to FIG. 21 except that the utility/ISO is not necessarily shown and flows of information of the interconnections appear to be indicated in FIG. 22. An event 104 may proceed from an auto DR system at symbol 69, as indicated by a label along a connection indicated by line 105 to an enterprise supervisor at symbol 101. The event 104 may proceed through the supervisor along a connection as indicated by line 106 to a site at symbol 103. The event may proceed on to an EMCS at symbol 72 at the site. An event confirmation, event feedback and/or an event feedback as indicated in label 107 may proceed from the EMCS at symbol 72 and the site at symbol 103 to the enterprise supervisor at symbol 101 along a connection indicated by line 106. The event confirmation, event feedback and/or event opt-out may proceed through the supervisor and a connection indicated by line 105 to the auto DR system at symbol 69. However, an opt-out as indicated by a label 108 may proceed along line 106 to the site at symbol 103 and EMCS at symbol 72. ADR activity as indicated by a label 109 may proceed from EMCS and the site along line 106 to the supervisor at symbol 101. ADR activity may incorporate event status, shed levels, and so on. The enterprise supervisor at symbol 101 may have an auto DR service 184 which incorporates an ADR monitor 185 and an ADR gateway 186. The supervisor at symbol 101 may also incorporate an enterprise data model 139, a web server 141, alarm management 142, batch services 143, history management 144, and so forth. Site 103 may incorporate more than one EMCS as in FIG. 14. The EMCS in symbol 72 of FIG. 22 may be like the EMCS in symbol 72 of FIG. 14. The EMCS may incorporate an auto DR service 118, device control and demand response strategies 119, site data model 121, web server 122, alarm management 123, history management 124, and so forth.

Figure 23:
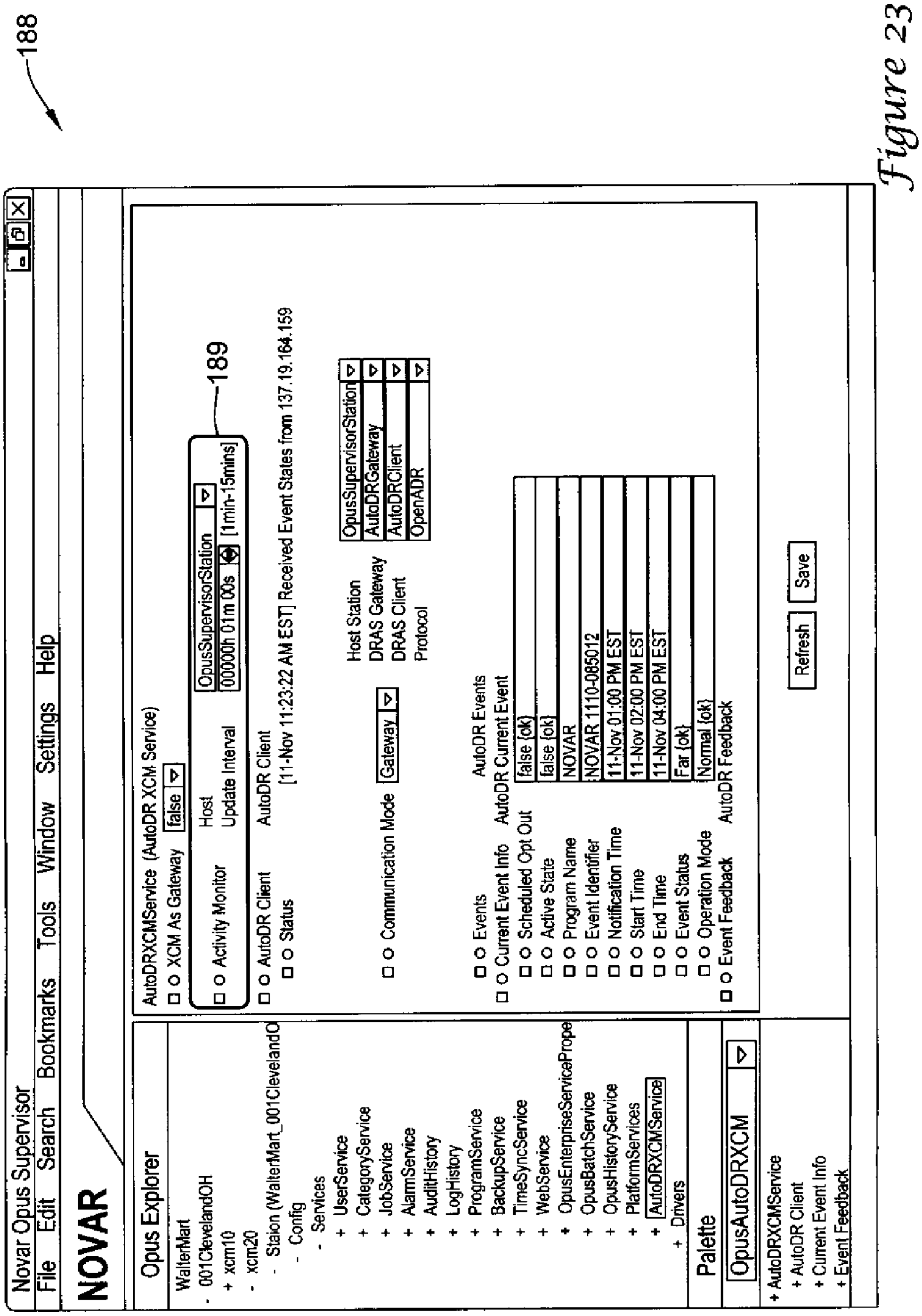
FIG. 23 is a screen print revealing a representation of an automated demand response service in an energy management and control system site controller having a component to select an activity monitor.

FIG. 23 is a screen print 188 revealing a representation of an auto DR service in an EMCS site controller having a component to select an activity monitor at symbol 189.

Figure 24:
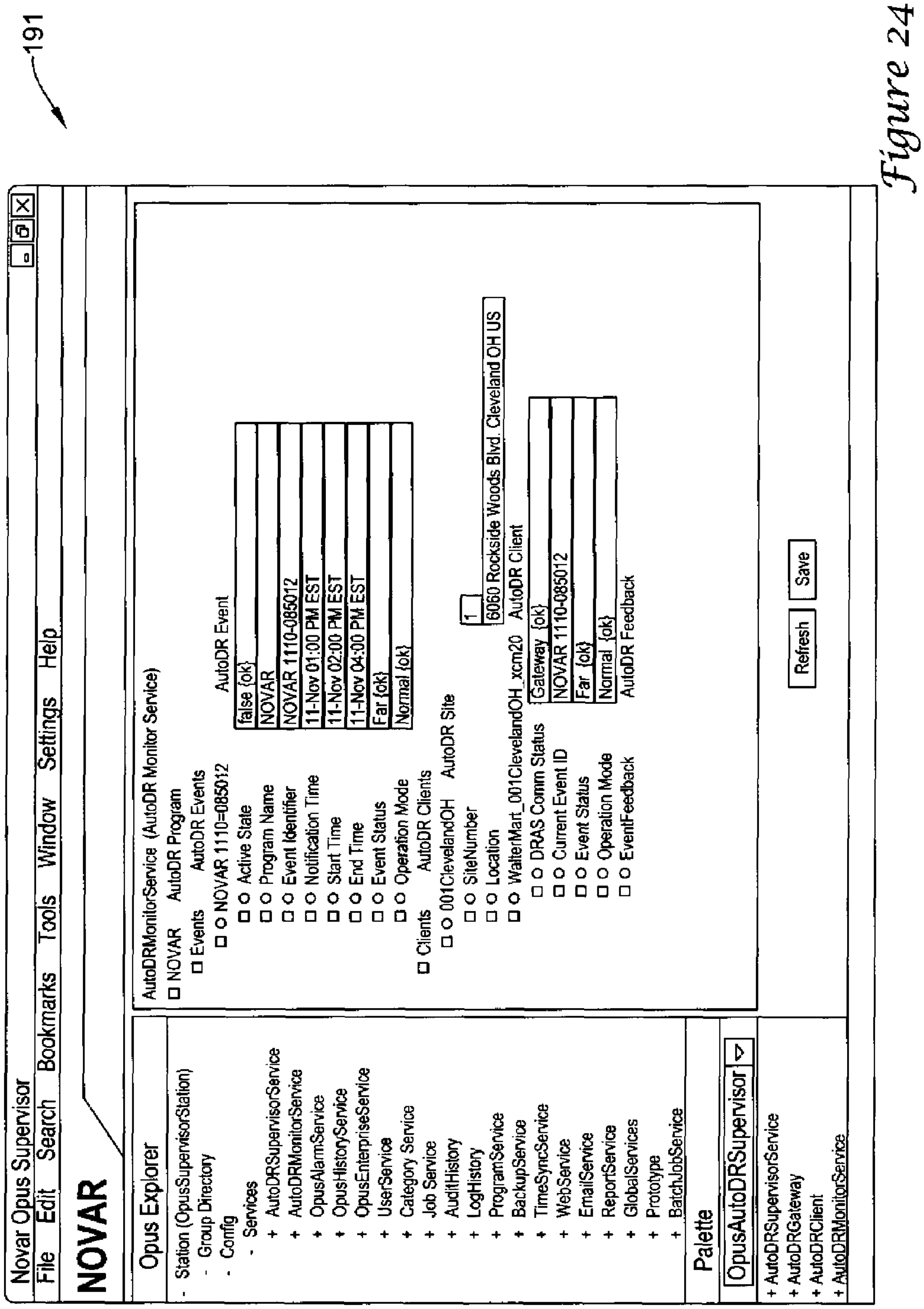
FIG. 24 is a screen print revealing an automated demand response monitor service in an energy management and control system supervisor.

FIG. 24 is a screen print 191 revealing an auto DR monitor service in an EMCS supervisor.

Figure 25:
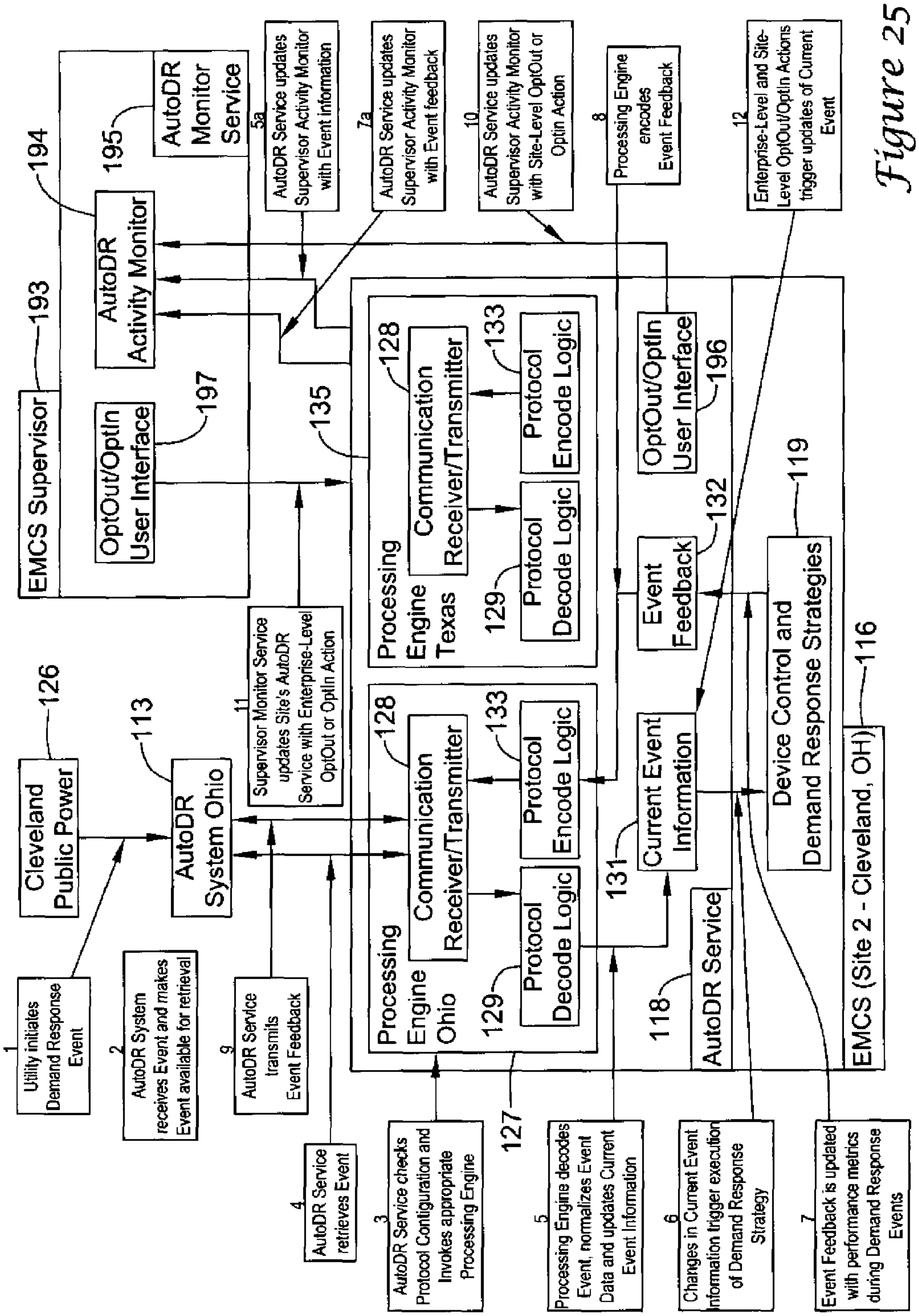
FIG. 25 is a flow diagram of an automated demand response monitor service.

FIG. 25 is a flow diagram of auto DR monitor service. Cleveland public power utility 126 may initiate a demand response event. Auto DR system 113 of Ohio may receive the event from utility 126 and make the event available for retrieval. An auto DR service 118 may check the protocol configuration of the event and invoke an appropriate processing engine. Auto DR service 118 may retrieve the event which goes to a communication receiver/transmitter 128 of a processing engine 127 for Ohio. The processing engine may decode the event, normalize the event data and update the current event information at symbol 131. Also, the auto DR service 118 may update an auto DR activity monitor 194 of an auto DR monitor service 195 with event information at an EMCS supervisor 193. Changes in current event information may trigger execution of a demand response strategy at symbol 119. From symbol 119 for device control and demand response strategies, event feedback from symbol 119 may be updated with performance metrics during demand response events to symbol 132. Also, the auto DR service 118 may update the auto DR activity monitor 194 with event feedback. The processing engine 127 may encode event feedback at protocol encode logic 133. The auto DR service may transmit event feedback from the communication receiver/transmitter 128 to the auto DR system at symbol 113. The auto DR service may update the auto DR activity monitor 194 with site-level opt-out or opt-in action from a user interface at symbol 196 of auto DR service at symbol 118. An opt-out/opt-in user interface at symbol 197 of the supervisor 193 auto DR monitor service 195 may update the site's auto DR service 118 with enterprise-level opt-out or opt-in action. Enterprise-level and site-level opt-out/opt-in actions may trigger updates of the current event.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the prior art to include all such variations and modifications.

What is claimed is:

1. A system for normalizing automated demand response events in energy management and control systems, comprising:

an energy entity that supplies energy to a customer, the energy entity initiating a demand response event;

an automated demand response system receiving the demand response event from the energy entity and making the demand response event available for retrieval in a first protocol; and an energy management and control system at a site of the customer retrieving the demand response event from the automated demand response system in the first protocol;

wherein the energy management and control system normalizes the demand response event into a standard format employed within the energy management and control system and provides event feedback to the automated demand response system in the first protocol;

wherein the energy management and control system is further configured to and is capable of normalizing into the standard format another demand response event retrieved in a second protocol from either the automated demand response system or another automated demand response system, and providing event feedback in the second protocol; and wherein the automated demand response system is external to the energy management and control system.

2. The system of claim 1, wherein the energy management control system comprises:

an automated demand response service; and a device control and demand response strategies module connected to the automated demand response service.

3. The system of claim 2, wherein the automated demand response service comprises:

a protocol configuration check mechanism; and two or more processing engines, wherein each of at least the first protocol and the second protocol is associated with a corresponding processing engine of the two or more processing engines; and wherein an appropriate processing engine of the two or more processing engines is invoked according to the first protocol of the demand response event, as determined by the protocol configuration check mechanism.

4. The system of claim 3, wherein the appropriate processing engine decodes the demand response event, normalizes the event and updates event information.

5. The system of claim 4, wherein:

the appropriate processing engine provides event information to the device control and demand response strategies module; and a variation, such as an update, of the event information can trigger the device control and demand response strategies module to execute a demand response strategy; and the event feedback comprises updated event information, performance metrics, one or more demand response strategies.

6. The system of claim 5, wherein the appropriate processing engine encodes the event feedback from the device control and demand response strategies module into the first protocol as determined by the protocol configuration check mechanism.

* * * * *